United States Patent [19]
Hara et al.

[11] Patent Number: 4,972,278
[45] Date of Patent: Nov. 20, 1990

[54] TAPE CASSETTE DRIVING SYSTEM COMPATIBLE WITH TWO CASSETTE TYPES OF DIFFERENT SIZES

[75] Inventors: Mitsuhiko Hara, Kawasaki; Hiromichi Hirayama, Yokosuka; Masato Mihara, Hiratsuka; Mitsuo Harumatsu, Tokyo, all of Japan

[73] Assignee: Victor Company of Japan, Ltd., Yokohama, Japan

[21] Appl. No.: 256,905

[22] Filed: Oct. 12, 1988

[30] Foreign Application Priority Data

Oct. 15, 1987 [JP] Japan .................................. 62-260584
Dec. 26, 1987 [JP] Japan .................................. 62-331188

[51] Int. Cl.⁵ ............................................. G11B 5/008
[52] U.S. Cl. ........................................ 360/94; 360/96.5
[58] Field of Search ................. 360/85, 94, 95, 96.1, 360/96.3, 96.5, 60, 132

[56] References Cited

U.S. PATENT DOCUMENTS 4,559,574 12/1985 Umeda ............................... 360/94 X

FOREIGN PATENT DOCUMENTS 0032443 8/1972 Japan ...................................... 360/94
54069 7/1986 Japan .
182658 8/1986 Japan .
182660 8/1986 Japan .
269257 11/1986 Japan .
0108546 5/1988 Japan ...................................... 360/94

Primary Examiner—Robert S. Tupper
Assistant Examiner—Andrew L. Sniezek
Attorney, Agent, or Firm—Michael N. Meller

[57] ABSTRACT

A tape cassette driving system of a video tape recorder for driving the reels of the tape cassette comprises a main chassis for supporting a standard size tape cassette and a sub-chassis for supporting a compact size tape cassette. The main chassis carries a reel disk for driving a take up reel of the standard size tape cassette and the sub-chassis carries a drive gear adapted for engagement with the reel disk on the main chassis and further for engagement with teeth formed on the periphery of the take up reel of the compact size tape cassette. The sub-chassis is connected to the main chassis by a plurality of swing arms such that the sub-chassis is movable up and down relative to the main chassis. As a result of the connection by the swing arms, the sub-chassis is moved along a circular path when it is moved up and down and the engagement of the drive gear with the toothed part of the reel disk can be achieved smoothly. Further, the reel disk comprises a braking mechanism for preventing the reel disk from rotating when the reel disk is moved up and down. The braking mechanism is controlled by a mechanism which also controls the movement of the sub-chassis up and down.

14 Claims, 27 Drawing Sheets (A)

(B)

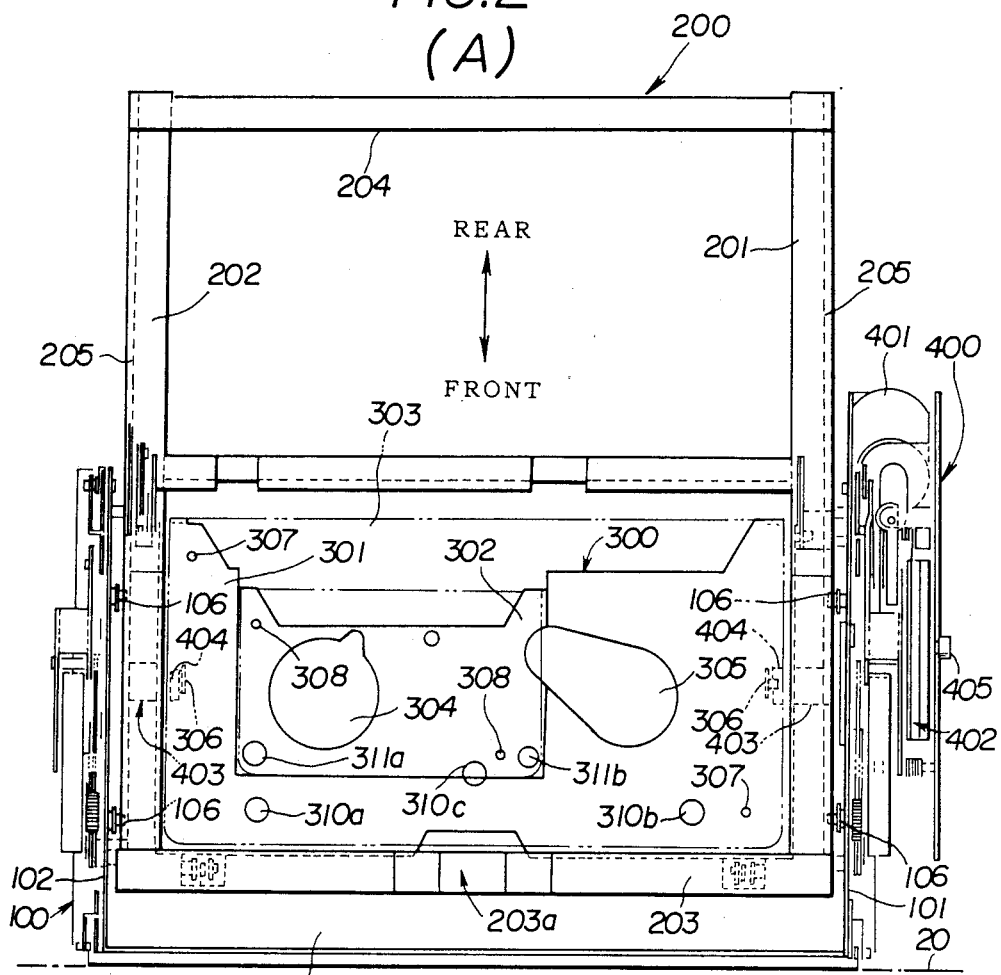
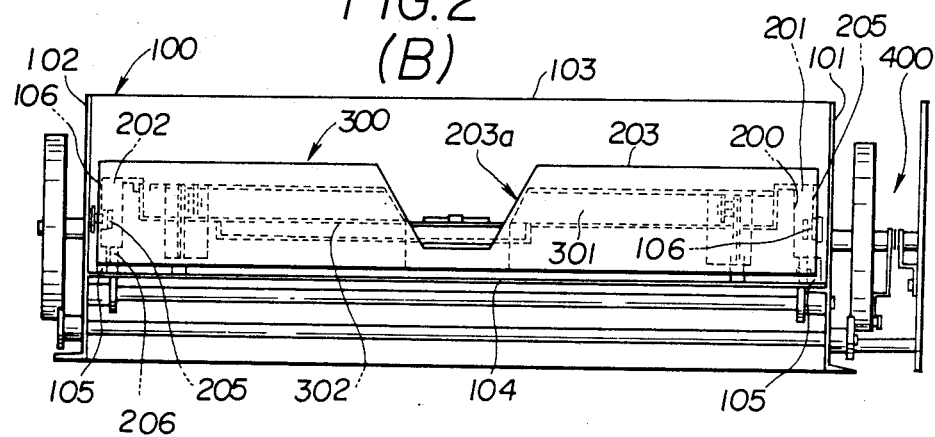

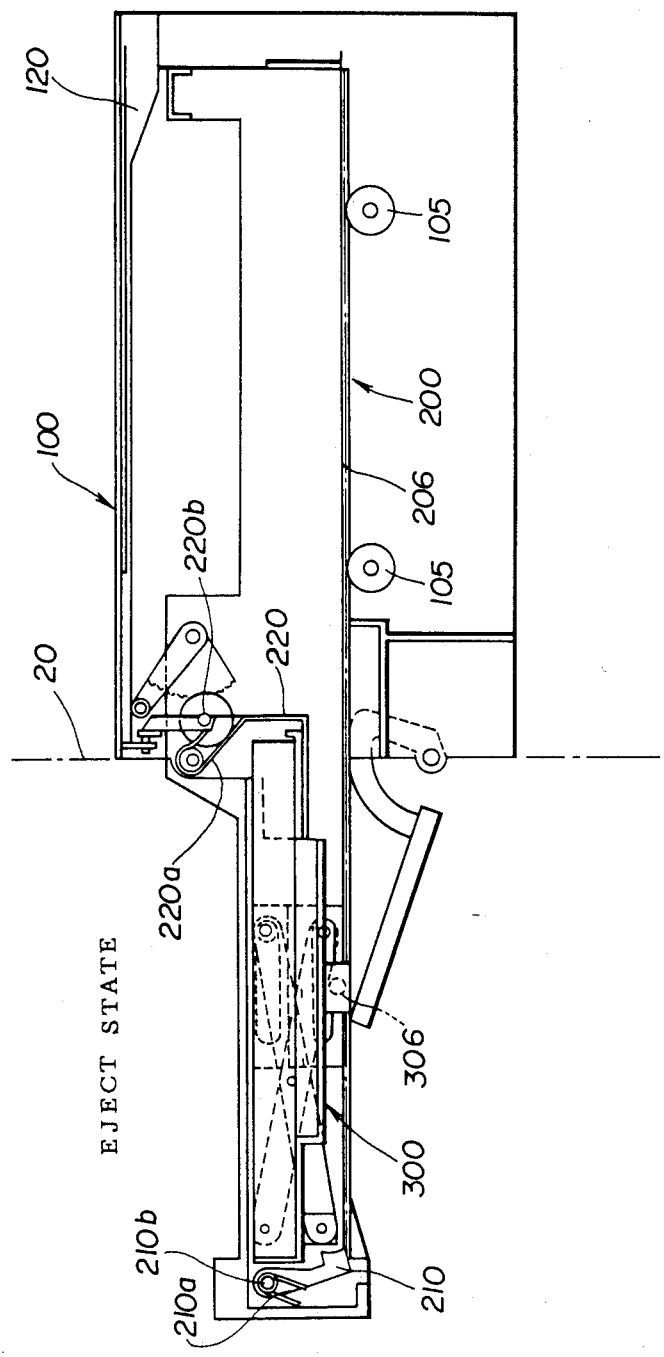

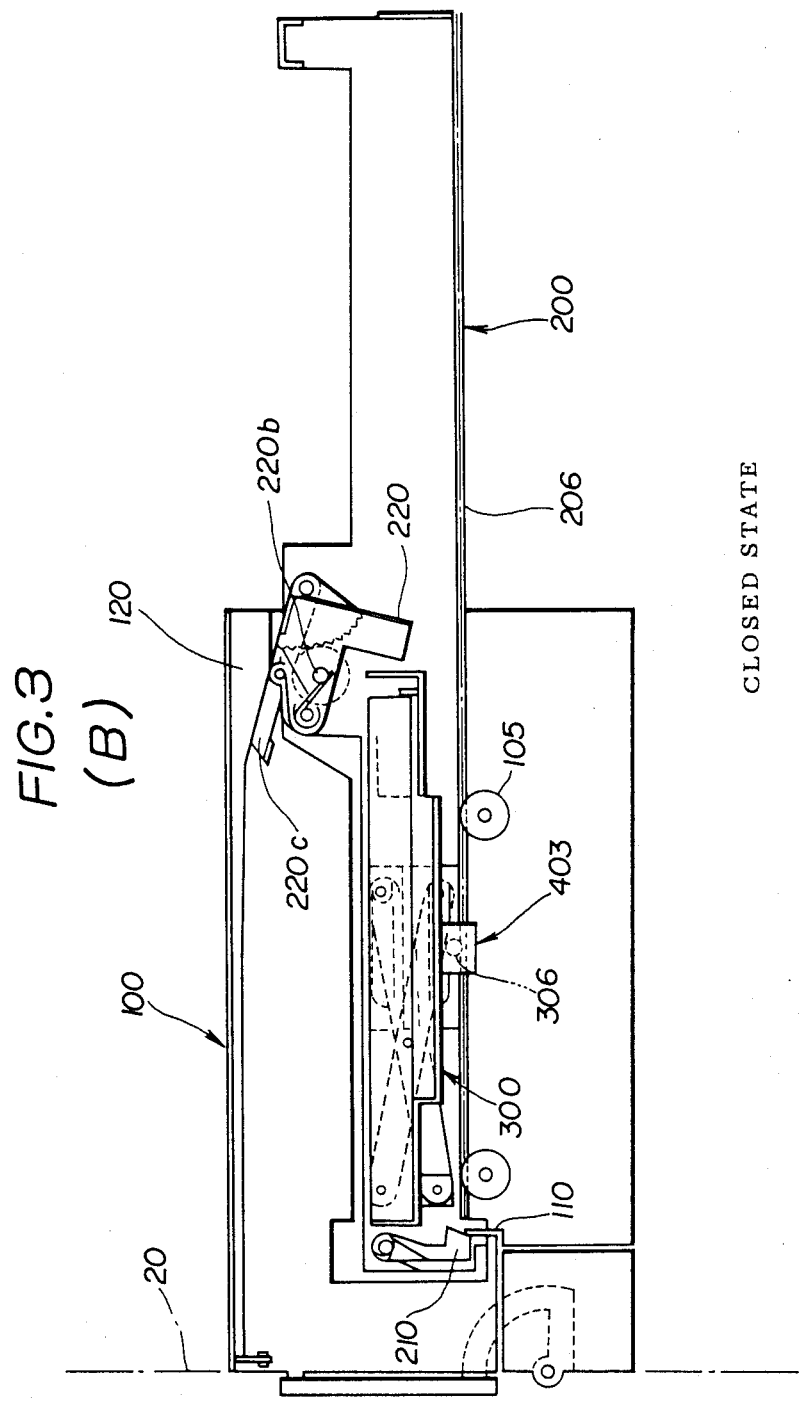

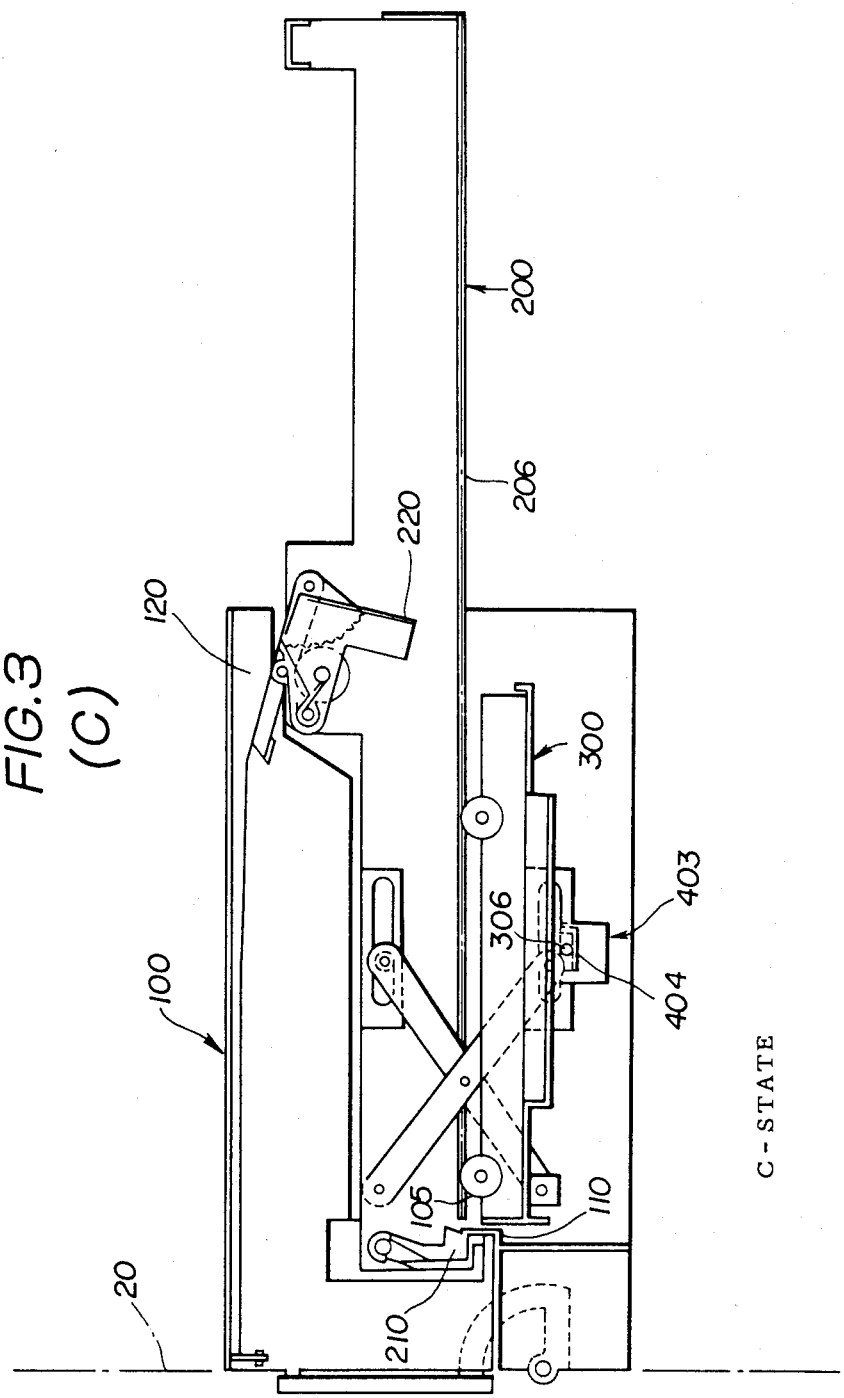

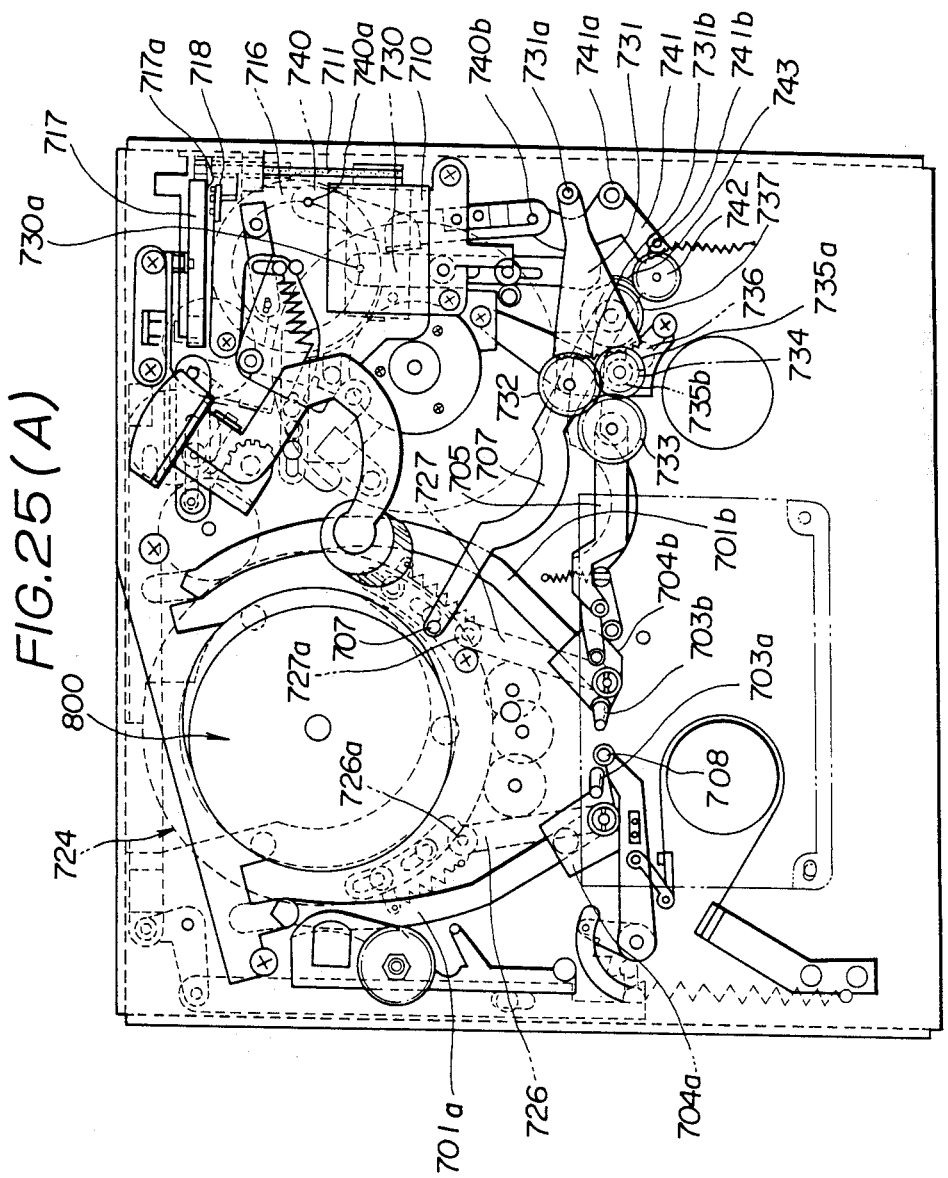

(B)

(A)

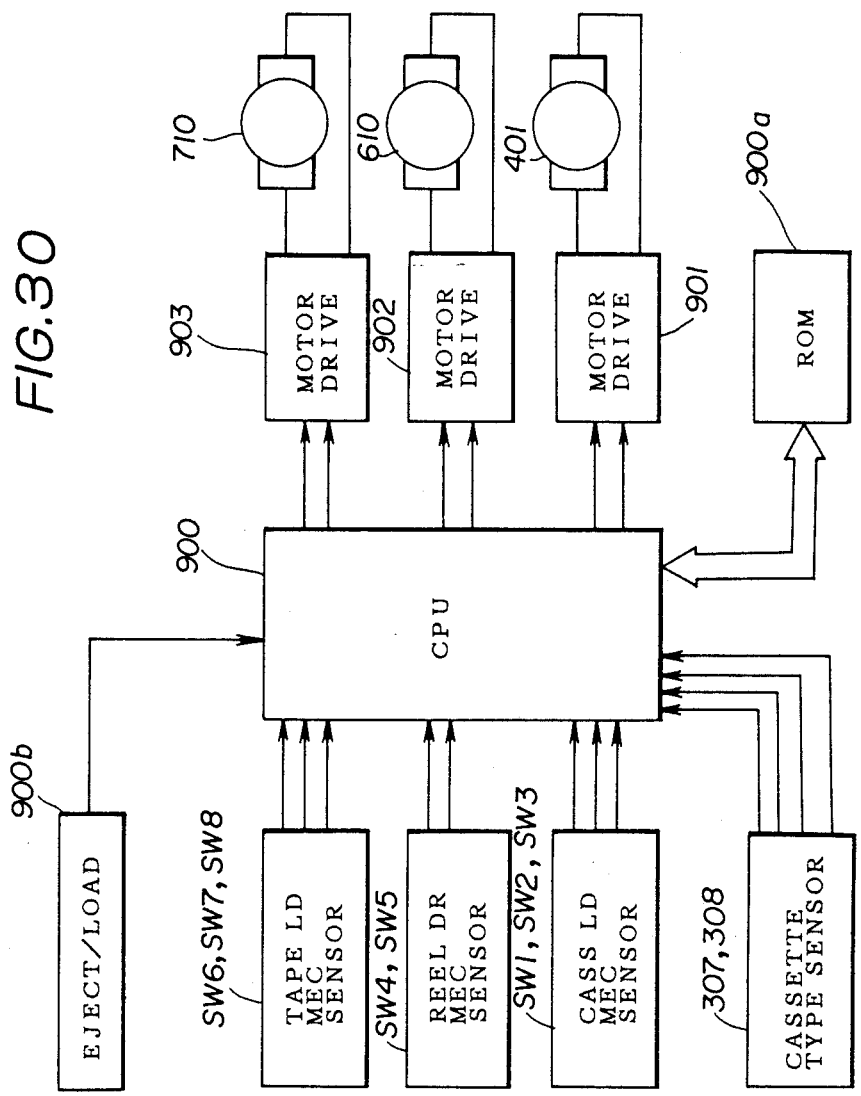

TAPE CASSETTE DRIVING SYSTEM COMPATIBLE WITH TWO CASSETTE TYPES OF DIFFERENT SIZES

BACKGROUND OF THE INVENTION

The present invention generally relates to a magnetic recording/reproducing apparatus, and particularly to a magnetic recording/reproducing apparatus not only capable of performing a recording and reproducing on and from a magnetic tape contained in a standard size tape cassette but also capable of performing a recording and reproducing on and from a magnetic tape contained in a compact size tape cassette.

Currently, a standard size tape cassette and a compact size tape cassette are used in a magnetic recording/reproducing apparatus such as a home video tape recorder. The standard size tape cassette and the compact size tape cassette have different dimensions. Particularly, the compact size tape cassette is used widely in a portable video tape recorder combined with a television camera. As the conventional home video tape recorders are designed to play the standard size tape cassette, the conventional video tape recorder cannot play the compact size tape cassette without using an adapter having a size identical to the size of the standard size tape cassette for accommodating the compact size tape cassette.

However, the use of such a separate adapter requires a loading operation of two steps, first for loading the compact size tape cassette on the adapter and then loading the adapter on the video tape recorder. Such a two step loading operation makes the loading operation performed by the user of the video tape recorder complex. Further, the use of the adapter adds an extra expense to the video tape recorder. Therefore, there is a demand for a video tape recorder equipped with a tape cassette loading system which can load both the standard size tape cassette and the compact size tape cassette without using a separate adapter.

According to the Laid-open Japanese Patent Application No. 54069/1986, a tape cassette loading system is known in which two different types of tape cassettes having different sizes can be loaded in a video tape recorder. The tape cassette loading system of this prior art is constructed such that reel disks for driving a supply reel and a take up reel of a loaded tape cassette are engaged with the respective reels directly when the standard size tape cassette is loaded and when the compact size tape cassette is loaded. However, the compact size tape cassette commonly available in the market has such a construction that the take up reel is driven by a gear engaged with a tooth formed on a periphery of a lower flange of the take up reel. Therefore, such a tape cassette cannot be used in the tape cassette loading system as disclosed in the aforementioned prior art.

Generally, the tape cassette is held on the video tape recorder at a predetermined position by engagement with a plurality of positioning pins provided on the tape cassette loading system of the video tape recorder. As the location of the portions of the tape cassette to be engaged with the positioning pins for the standard size tape cassette is different from that of the compact size tape cassette, the tape cassette loading system has to be able to change the location of the positioning pins on the tape cassette loading system depending on the type of the tape cassette to be loaded. The aforementioned prior art tape cassette loading system has a construction in which the movement of the reel disk responsive to the type of the tape cassette and the movement of the positioning pins responsive to the type of the tape cassette are made separately. Thus, the prior art tape cassette loading system has a further problem in that the predetermined relationship in the position of the reel disk and the positioning pins may be lost as a result of the movement of the reel disks and the positioning pins.

Further, there is proposed a tape cassette loading system in which a separate sub-chassis is used for carrying a drive gear for driving the take up reel of the compact size tape cassette, an intervening gear member for meshing with the drive gear and further meshing with the reel disk for the take up reel of the standard size tape cassette, and a plurality of positioning pins for engagement with the compact size tape cassette for positioning are carried separately from a main chassis which carries the reel disks for engagement with the take up reel and the supply reel of the standard size tape cassette together with a plurality of positioning pins for positioning the standard size tape cassette. In this construction, the sub-chassis is moved up and down responsive to the type of the tape cassette to be played. Thus, when the compact size tape cassette is to be played, the sub-chassis is raised and the intervening gear member for meshing with the drive gear of the take up reel of the compact size tape cassette is engaged with the reel disk for the take up reel on the main chassis. On the other hand, when playing the standard size tape cassette, the sub-chassis is lowered and the drive gear for the take up reel of the compact size tape cassette is disengaged from the reel disk for driving the supply reel of the standard size tape cassette. Thereby, the drive gear is also disengaged from the standard size tape cassette.

In this construction, there is a problem that the engagement of the intervening gear member with corresponding teeth on the reel disk referred to hereinafter as a reel gear member may cause a jamming when the sub-chassis is simply raised or lowered in the vertical direction relative to the main chassis. In the worst case, the sub-chassis becomes immovable up and down as a result of the jamming. Further, it is desired in the aforementioned construction that the reel disk on the main chassis for driving the take up reel of the standard size tape cassette be not rotated during the movement of the sub-chassis in the upward direction so as to avoid excessive stretching or slackening of the magnetic tape in the tape cassette. On the other hand, from the viewpoint of the engagement of the intervening gear member and the reel gear member, it is necessary that the reel gear be freely rotatable in order to achieve a smooth engagement of the intervening gear member and the reel gear member.

In general, it is necessary to apply or release a brake to or from the reel disk with a suitable timing whatever the type of the used tape cassette may be. The braking of the reel disk is usually performed by driving a braking mechanism provided on the reel disk by using a main gear which drives the tape cassette loading system. In the case of the tape cassette loading system as disclosed in the aforementioned Laid-open Japanese Patent Application No. 54069/1986, the braking mechanism also must be moved responsive to the movement of the reel disk. Further, the mechanism used for driving the braking mechanism should be switched responsive to the type of the tape cassette. As a result, the tape cassette loading system in such a prior art becomes inevitably complex and the size of the video tape recorder is increased.

SUMMARY OF THE INVENTION

Accordingly, it is a general object of the present invention to provide a novel and useful tape cassette loading system of a magnetic recording/reproducing apparatus wherein the aforementioned problems are eliminated.

Another object of the present invention is to provide a tape cassette loading system of a magnetic recording/reproducing apparatus which can load and unload both a standard size tape cassette and a compact size tape cassette while maintaining an exact positional relationship between a reel disk and a plurality of positioning pins. According to the present invention, the magnetic recording and reproducing apparatus can be loaded with either of the standard size tape cassette and the compact size tape cassette by means of the tape cassette loading system and can play both the standard size tape cassette and the compact size tape cassette. In the tape cassette loading system of the present invention, the positioning pins for the standard size tape cassette are carried on a main chassis while the positioning pins for the compact size tape cassette are carried on the sub-chassis having a framework structure. As all positioning pins on the sub-chassis are moved unitarily when the sub-chassis is moved up and down, the positional relationship between the individual positioning pins is maintained even if the sub-chassis is moved. Furthermore, the position of the sub-chassis is determined as a result of a contact of a positioning member on the sub-chassis with the main chassis when the sub-chassis is in the raised state. In other words, the position of the sub-chassis is precisely determined relative to the main chassis.

Another object of the present invention is to provide a tape cassette loading system of a magnetic recording/reproducing apparatus wherein an intervening gear member and a reel gear member are meshed smoothly with each other responsive to the upwards and downwards movement of the sub-chassis.

Another object of the present invention is to provide a tape cassette loading system of a magnetic recording/reproducing apparatus wherein a timely braking of a reel disk can be performed irrespective of the fact that the standard size tape cassette is loaded on the tape cassette loading means or the compact size tape cassette is loaded on the tape cassette loading means. According to the present invention, the braking of the reel disk can be reliably achieved in both of the cases in which the standard size tape cassette is loaded on the tape cassette loading system and the compact size tape cassette is loaded on the tape cassette loading system. Further, as a result of the present invention, the braking mechanism can be significantly simplified.

Other objects and further features of the present invention will become apparent from the following detailed description of preferred embodiments of the tape cassette loading system of the present invention when read in conjunction with attached drawings.

BRIEF DESCRIPTION OF THE DRAWINGS

FIGS. 2(A) and (B) are respectively a plan view and a front view showing an embodiment of the tape cassette loading system of the present invention.

FIG. 30 is a block diagram showing a controller for detecting the state of the cassette tray, the reel drive mechanism and the tape loading mechanism and for controlling drive motors used for driving these mechanisms.

DETAILED DESCRIPTION

Figure 1:
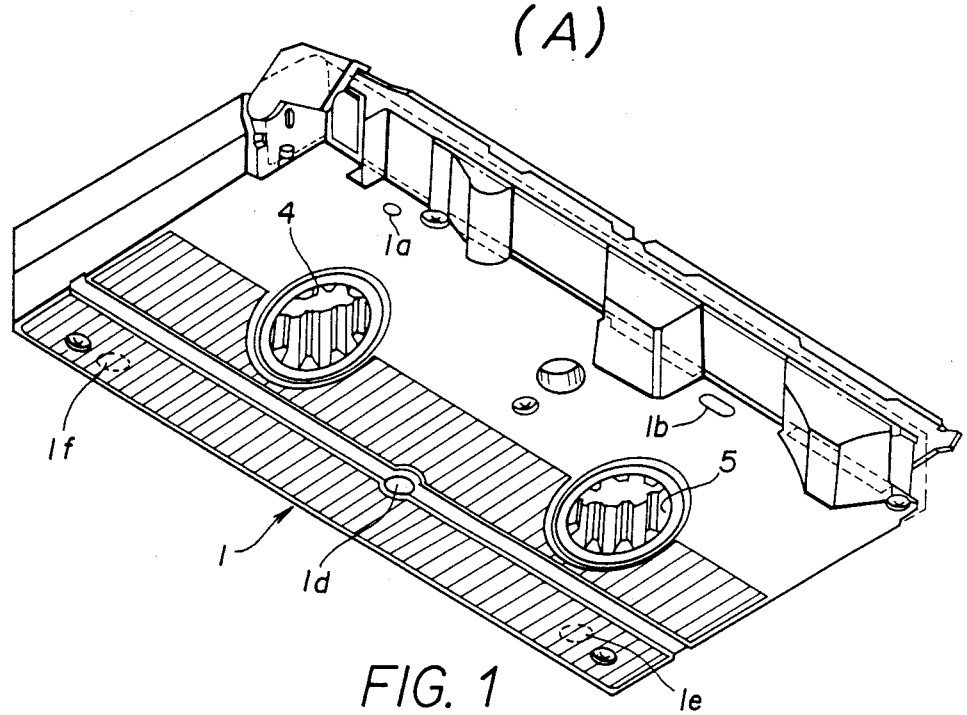
FIGS. 1(A) and (B) are perspective views respectively showing a standard size tape cassette and a compact size tape cassette used in the tape cassette loading system of the present invention.
Figure 1:
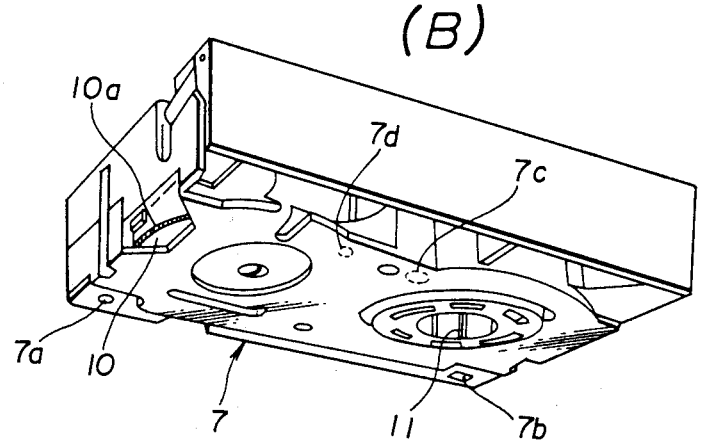

FIG. 1(A) shows a standard size tape cassette 1 used in the tape loading system of the present invention in a state in which a front lid of the tape cassette for protection of a magnetic tape contained therein is slightly opened. The tape cassette may have a typical dimension of 188×104×25 mm. The magnetic tape (not shown) is wound on a take up reel 4 and a supply reel 5 and extends along a front wall 6 of the tape cassette 1. On the front wall 6 of the tape cassette 1 there is further provided various cutouts such as a cutout 2 and a cutout 3 for accepting a tape loading mechanism to be described in detail later which draws out the magnetic tape from the tape cassette 1 and wraps the magnetic tape around a guide drum (not shown) carrying plurality of magnetic heads thereon.

FIG. 1(B) shows a compact size tape cassette 7 having a size substantially smaller than the size of the standard size tape cassette. The tape cassette 7 has a take up reel 10 and a supply reel 11 on which the magnetic tape is wound. As a consequence of the reduced size of the tape cassette, the distance between the take up reel and the supply reel is smaller as compared to the distance between the take up reel 4 and the supply reel 5 of the standard size tape cassette 1. The tape cassette 7 further has a cutout 8 and a cutout 9 for accepting the tape loading mechanism similar to the case of the standard size tape cassette. As a result of the difference in the size of the tape cassette, the cutouts 8 and 9 are also different in size and shape as compared to the cutouts 2 and 3 in the standard size tape cassette. Further, the take up reel 11 is driven by meshing a drive gear of a reel drive mechanism to a tooth 10a formed around the periphery of the take up reel 10 in the compact size tape cassette whereas in the standard size tape cassette a drive shaft of the reel drive mechanism is directly inserted to a bore formed in the take up reel 4.

Thus, the tape cassette loading system which can handle both the standard size tape cassette and the compact size tape cassette should be able to adapt to the difference in the size and shape of the cutouts, difference in the distance between the take up reel and the supply reel and the method by which the take up reel is driven, by shifting the position or state of the tape loading mechanism, the reel drive mechanism and the like.

Next, the tape cassette loading mechanism of the present invention will be described. The tape cassette loading mechanism of the present invention uses a cassette loading mechanism comprising a cassette tray which is a generally rectangular tray adapted for accepting a standard size tape cassette and further having a depression adapted for accepting a compact size tape cassette, a carriage for carrying the cassette tray in a horizontal direction between a first state in which the cassette tray is located substantially outside the video tape recorder so that the user can easily place and remove the standard size tape cassette or compact size tape cassette on and from the cassette tray and a second state in which the cassette tray is located inside the video tape recorder substantially above a ready-for-loading position in which the magnetic tape in the tape cassette is in a position ready for being drawn out so that the magnetic tape is wrapped around the guide drum, and a cassette tray drive mechanism for moving the carriage in a horizontal direction and for moving the cassette tray in a vertical direction between said second state, a first ready-for-loading position for the compact size tape cassette, and a second ready-for-loading position for the standard size tape cassette.

Figure 3:
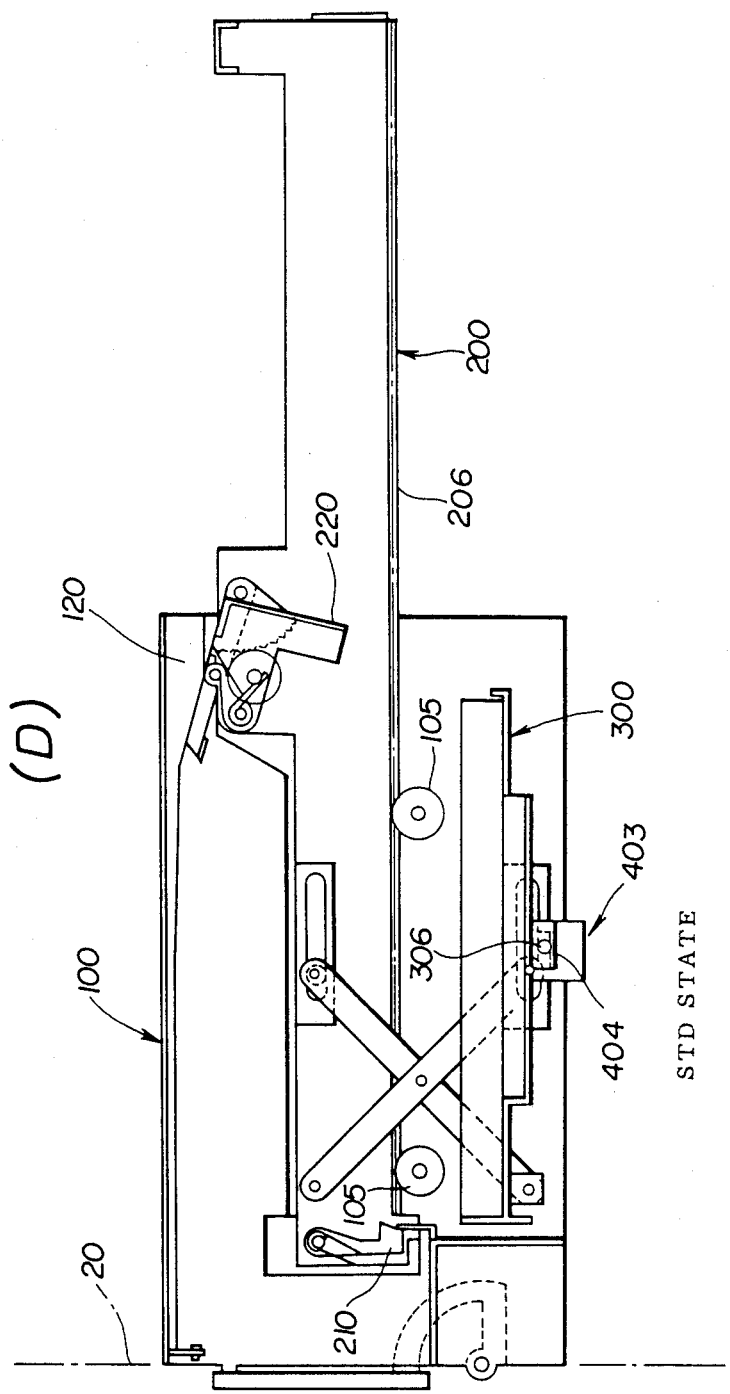
FIGS. 3(A)-(D) are side views showing various states of the tape cassette loading system of FIGS. 2(A) and (B)

Referring to FIGS. 2(A) and (B), the cassette loading mechanism of the present invention comprises a housing 100, a carriage 200, a cassette tray 300 and a cassette tray drive mechanism 400. The housing 100 comprises a pair of side walls 101 and 102, a top wall 103 and a bottom wall 104 as clearly seen in FIG. 2(B). The side walls 101 and 102 are provided with a pair of vertical guide grooves 107a 107b be described later, and carry a pair of opposing rollers 105 and another pair of opposing rollers 106 at the respective internal surfaces (see FIG. 3(A) and (B)). The carriage 200 comprises a pair of side frames 201 and 202, and a pair of front and rear frames 203 and 204. The side frames 201 and 202 are supported on the guide rollers 105 and be movable horizontally in a front direction and a rear direction. In the present specification, the rear direction is defined as the direction indicating the inside of a body 20 of the video tape recorder and the front direction is defined as the direction indicating the outside of the body 20 of the video tape recorder as shown in FIG. 2(A). Further, each of the side frames 201 and 202 are provided with a guide groove 205 extending along the frame, and the aforementioned guide rollers 106 engage with the guide grooves 205 as can be seen in FIG. 2(B). Thus, the carriage 200 is movable horizontally in the front and rear directions stably guided by the guide rollers 105 and 106. At the bottom of the side frames 201 and 202 to which the guide rollers 105 are engaged, a toothed portion 206 is formed as can be seen in FIGS. 3(A) and (B). This tooth 206 is engaged with a gear of a cassette tray drive mechanism 400 including a motor 401 shown in FIG. 2(A) as will be described later with reference to FIGS. 4(A) and (B), and the carriage 200 is moved horizontally in the front and rear directions responsive to energization of the motor 401.

The cassette tray 300 is a generally rectangular tray as can be seen in FIG. 2(A) and comprises a main part 301 for supporting the standard size tape cassette 1 placed thereon and a generally rectangular depression 302 for supporting the compact size tape cassette 7. As can be seen in the drawing, the depression 302 is formed on a part of the main part 301. Further, the main part 301 and the depression 302 are formed with a cutout 303 for allowing entrance of a tape loading member to be described later with reference to FIG. 10 and a pair of openings 304 and 305 for allowing insertion of a reel drive mechanism to be described later with reference to FIGS. 7(A)–(C) for driving of the take up reel and the supply reel. The cassette tray 300 further has a pair of pins 306 close to the center of its right side edge and its left side edge. These pins 306 engage with a U-shaped groove 404 (FIG. 3(C)) of an elevating member 403 which moves vertically responsive to the mechanism 400. Further, the cassette tray 300 carries switches 307 for detecting the placement of the standard size tape cassette on the main part 301 and switches 308 for detecting the placement of the compact size tape cassette on the depression 302. The switches 307 and 308 may each be a type of switch which is closed by the weight of the tape cassette placed on the cassette tray. In other words, the switch 307 is closed when the standard size tape cassette is placed on the main part 301 of the cassette tray 300 and the switch 308 is closed when the compact size tape cassette is placed on the depression 302 of the cassette tray 300.

FIG. 2(B) further shows a conspicuous cutout 203a provided on the rear frame 203 of the carriage 200. This cutout is for facilitating the removal of the standard size tape cassette placed on the cassette tray 300. A corresponding cutout is formed also on the rear wall of the cassette tray 300.

FIG. 3(A) shows a state in which the carriage 200 in fully moved to the front direction and the cassette tray 300 is located outside the body 20 of the video tape recorder. This state is called an unloading position and will be designated as an EJECT state. In this state, the placement or removal of the tape cassette on and from the cassette tray 300 can be made by the user without difficulty. FIG. 3(B) on the other hand shows a state in which the carriage 200 is fully moved in the rear direction into the body 20 of the video tape recorder. In the following description, this state will be referred to as a CLOSED state. FIG. 3(C) shows another state in which the cassette tray 300 is lowered by the mechanism 400 to a state in which the compact size tape cassette on the cassette tray 300 assumes a position ready for loading the magnetic tape on a drum (not shown) of the video tape recorder. This state will be referred to as a C state. FIG. 3(D) on the other hand shows a state in which the cassette tray 300 is fully lowered by the mechanism 400. In this state, the standard size tape cassette held on the cassette tray 300 assumes a position ready for loading the magnetic tape of the tape cassette on the guide drum of the video tape recorder. The difference in the level of the cassette tray 300 between the C state and a standard state shown in FIG. 3(D) arises due to the difference in the size of the tape cassette. Thus, this standard state will be called an STD state.

FIGS. 3(A)–(D) further show a mechanism for releasably holding the cassette tray 300 on the carriage 200. The mechanism comprises a catch 210 rotatably provided on the carriage 200 around a pin 210b and a closing member 220 rotatably held on the carriage 200 around a pin 220b. The catch 210 is urged in a counterclockwise direction in FIG. 3(A) by a spring 210 and holds a front end of the depression 302 formed in the cassette tray 300. Further, the closing member 220 is urged by a spring 220a in a clockwise direction and holds the cassette tray 300. In the EJECT state shown in FIG. 3(A), the closing member 220 closes the cutout 303 formed at the rear end of the cassette tray 300. Thus, the closing member 220 not only holds the cassette tray 300 on the carriage 200 but also protects the video tape recorder from penetration of dust through the cutout 303 when the cassette tray 300 is fully moved in the front direction. When the carriage 200 is moved in the rear direction to the CLOSED state shown in FIG. 3(B), the catch 210 is engaged with a stopper 110 formed on the housing 100 and is rotated in the clockwise direction. Thus, the catch 210 is released from the cassette tray 300. Further, a lever portion 220b formed on the closing member 220 is engaged with a slope 120 formed on the housing 100 and the closing member 220 is rotated in the counterclockwise direction as shown in FIG. 3(B). In this state, the closing member 220 is released from the cassette tray 300. In other words, the cassette tray 300 is disengaged from the carriage 200 in the CLOSED state and is held in the elevating member 403 of the mechanism 400.

Next, the drive mechanism 400 will be described with reference to FIGS. 4(A) and (B). The drive mechanism 400 comprises the motor 401 and a gear train 402 comprising a main gear 402a, a cam gear 402b and a carriage drive gear 402c. The main gear 402a is rotated responsive to the rotation of the motor 401 and responsive to the rotation of the main gear 402a, the cam gear 402b and the carriage drive gear 402 are rotated. The carriage drive gear 402 is meshed with the tooth 206 formed on the side frame 201, 202 of the carriage 200 and the carriage 200 is moved horizontally in the front direction or in the rear direction responsive to the energization of the motor 401. Further, the mechanism 400 comprises a swing arm 406 which is rotatably fixed on the side wall 101 of the housing 100 by a pin 407. The cam gear 402b carries on its inner side a generally spiral-shaped cam groove 415 (FIGS. 6(A)–(D)) and a pin 408 formed on an intermediate position on the arm 406 is engaged with the cam groove 415. As can be seen from FIGS. 6(A)–(D), the cam groove 415 comprises a concentric part 415a positioned at a constant distance from the center of the cam disk 402b and a spiral part 415b which increases in distance from the center of the cam gear 402b with the rotation of the cam gear 402b. Thus, the arm 406 does not move as long as the pin 408 is engaged with the concentric part 415a of the groove 415 while the arm 406 is swung upwards or downwards responsive to the rotation of the cam gear 402b when the pin 408 is engaged with the spiral part 415b of the groove 415. The arm 406 has on its tip end far from the end where it is held on the side wall 101 by the pin 407 an elongated hole 409, and a pin 410 which is connected to the aforementioned elevating member 403 is engaged with the hole 409. The pin 410 is guided in a vertical guide groove 107 formed on the side wall 101 of the housing 100 and is moved vertically responsive to the swinging portion of the arm 406. The elevating member 403 is formed with a U-shaped groove 404 and the pin 306 of the cassette tray 300 is engaged in the groove 404. Thus, the cassette tray 300 is moved vertically up or down responsive to the energization of the motor when the pin 408 is engaged with the spiral part 415b of the cam groove 415 on the cam gear 402b.

Further, it should be noted that the main gear 402a which drives the gear 402c for movement of the carriage 200 has its tooth $402_{a-1}$ (FIGS. 6(A)–(C)) for a limited arc length. Thus, the continuous driving of the carriage 200 after the carriage is moved completely to the CLOSED state in FIG. 3(B) is avoided.

Figure 4:
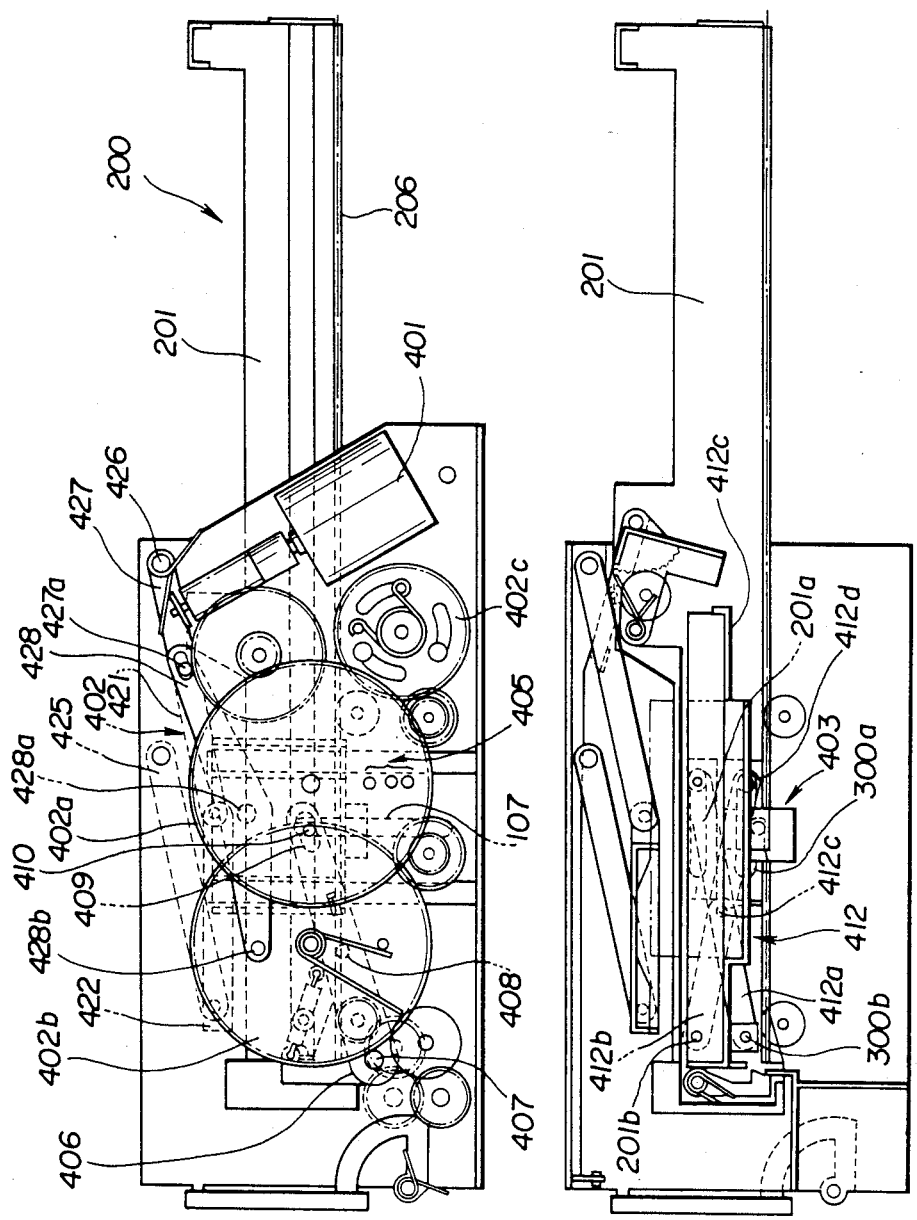
FIGS. 4(A) and (B) are side views respectively showing mechanisms for moving a cassette tray which holds the standard size tape cassette or compact size tape cassette in a horizontal direction and in a vertical direction.
Figure 5:
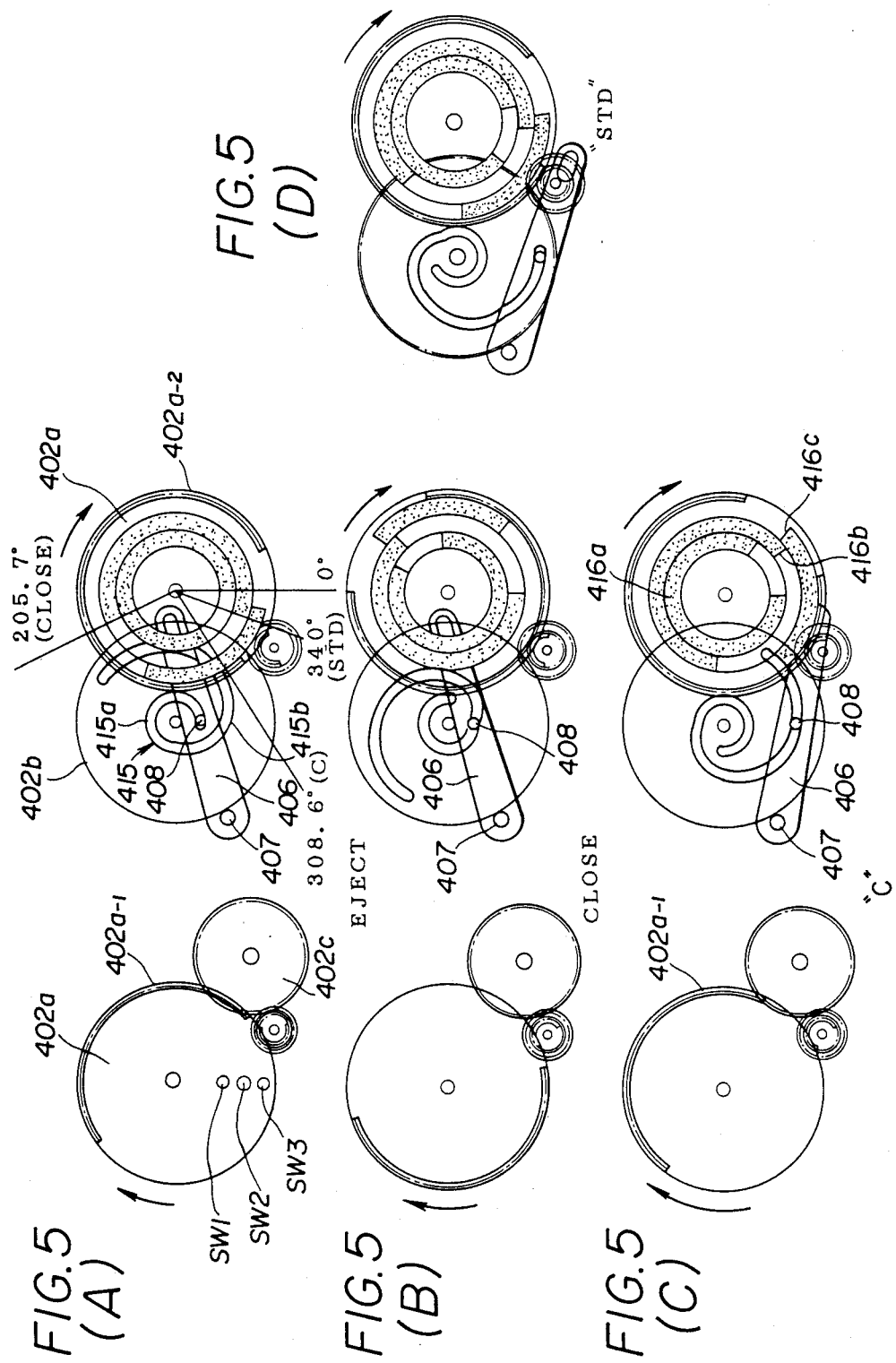
FIGS. 5(A)-(D) are diagrams showing a cam gear and detector used in the mechanism in FIGS. 4(A) and (B)

FIG. 4(B) further shows a link mechanism 412 for maintaining the cassette tray horizontally during ascent or descent of the cassette tray 300. The link mechanism 412 comprises a pair of link arms 412a and 412b which cross one another at a center of each of the link arms so as to form an X-shaped configuration. A pin 412c in inserted through the center of each of the link arms so as to rotatably hold the pair of the link arms. An end of link arm 412a is connected to the cassette tray 300 by a pin 300b and the other end of the link arm carries a roller 412c which slidably engages with a groove 201a formed on the side frame 201 of the carriage 200. Further an end of the link arm 412b is connected to the side frame 201 by a pin 201b and the other end of the link arm 412b carries a roller 412d which slidably engages with a groove 300a formed in the cassette tray 300. Thus, the cassette tray 300 is held horizontally as it is moved in the vertical direction by the arm 406 as illustrated in FIGS. 3(A)-(D).

FIGS. 5(A)-(D) shows the cam groove 415 carried by the cam gear 402b and a detector comprising optical sensors SW1, SW2 and SW3 for detecting the rotational angle of the main gear 402a. As the cam gear 402b and the gear 402c are driven by the main gear 402a, one can know the state of the cassette loading mechanism shown in FIGS. 3(A) by detecting the angle of rotation of the main gear 402a. For this purpose, a plurality of concentric reflection stripes 416a-416c are provided on the surface of the main gear 402a, and the optical sensors SW1-SW3 detect the reflection from the reflection stripes. Responsive to the rotation of the main gear 402s, the output of the optical sensors is changed. This output is used by a controller to be described later for discriminating the state of the cassette loading mechanism.

Next, a reel drive mechanism used in the tape cassette loading system for driving the take up reel and supply reel of the tape cassette will be described. As the level of the cassette tray 300 differs in the C state and in the STD state, it is necessary to change the level of the reel drive mechanism responsive to the level of the cassette tray such that the reel drive mechanism assumes a raised UP state when the cassette tray is in the C state and a lowered DOWN state when the cassette tray is in the STD state. In the description heretofore, the state of the tape cassette loading system in which the cassette loading mechanism is in the STD state and the reel dive mechanism is in the DOWN state will be referred to as a STANDARD mode, and the state of the tape cassette loading system in which the cassette loading mechanism is in the C state and the reel drive mechanism is in the UP state will be referred to as a COMPACT mode.

Figure 6:
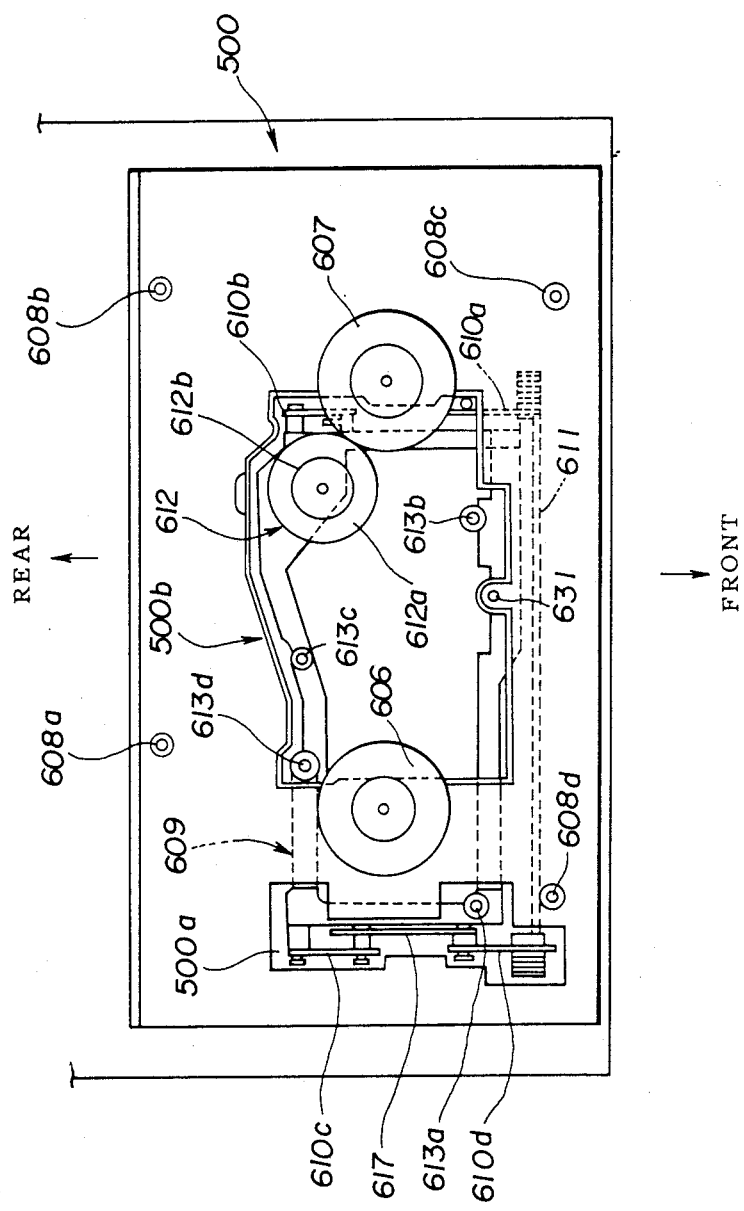
FIG. 6 is a plan view showing general construction of a reel drive mechanism used in the tape cassette loading system of the present invention.

Referring to FIG. 6, the reel drive mechanism comprises a main chassis 500 fixed to the housing 100 of the tape cassette loading system. The main chassis carries positioning pins 608a and 608b for determining the horizontal position of the standard size tape cassette in the STANDARD mode, level reference pins 608c and 608d for determining the level of the standard size tape cassette in the STANDARD mode, a pin 631 for releasing the brake of the reels in the standard size tape cassette in the STANDARD mode, and a supply reel disk 606 and a take up reel disk 607 for driving the supply reel and the take up reel of the standard tape cassette held in the STANDARD mode by the cassette tray 300. In the STANDARD mode, the pins 608a and 608b enter the cutout 303 of the cassette tray 300 and engage with corresponding depressions 1a and 1b on the bottom of the standard size tape cassette 1 on the cassette tray 300 (FIG. 1(A)), the pins 608c and 608d penetrate the cassette tray 300 through corresponding holes 310a and 310b (FIG. 2(A)) and support the bottom of the standard size tape cassette at a predetermined level, and the pin 631 penetrates the cassette tray 300 through a corresponding hole 310c and engages with a hole 1d (FIG. 1(A)) for accepting the pin 631. Further, the reel disks 606 and 607 are accepted in the openings 304 and 305 of the cassette tray 300 when the cassette tray 300 is lowered from the CLOSED state to the STD state. Thus, the main chassis 500 is disposed on the housing 100 at a position immediately below the cassette tray 300 when the cassette tray 300 is in the CLOSED state from which the cassette tray is vertically lowered to the C state and to the STD state.

Referring to FIG. 6 again, the reel drive mechanism further comprises a sub-chassis 609 provided below the main chassis 500 in a manner movable up and down relative to the main chassis 500. The sub-chassis 609 carries positioning pins 613a and 613b for positioning the compact size tape cassette in the COMPACT mode, and level reference pins 613c and 613d for determining the level of the compact size tape cassette in the COMPACT mode. In the UP state of the reel drive mechanism corresponding to the COMPACT mode of the tape cassette loading system, the sub-chassis is raised and the pins 613a and 613b penetrate through corresponding holes 311a and 311b (FIG. 2(A)) in the cassette tray 300 and engage with depressions 7a and 7b (FIG. 1(B)) formed on the bottom of the compact size tape cassette 7 on the cassette tray 300. Similarly, the reference pins 613c and 613d abut predetermined positions 7c and 7d provided on the bottom of the compact size tape cassette 7 for level adjustment. Further, the sub-chassis 609 carries a drive gear 612 having a toothed lower flange part 612b which engages with a toothed part 607a of the take up reel disk 607 on the main chassis 500 when the sub-chassis 609 is in the UP state and further having a toothed upper flange part 612a for engagement with the tooth 10a of the take up reel 10 of the compact size tape cassette 7 when the sub-chassis 609 is in the UP state. In order to allow the engagement of the pins 613a, 613b, 613a and 613b and the gear 612 on the sub-chassis 609 which in turn is located below the main chassis 500, with the compact size tape cassette 7, the main chassis 500 is further provided with cutouts 500a and 500b as shown in FIG. 6.

Figure 10:
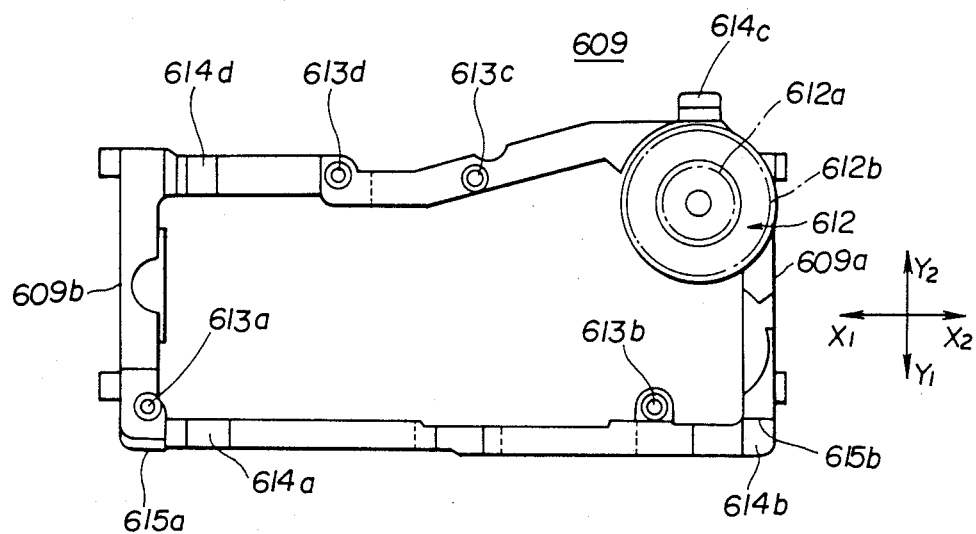
FIG. 10 is a plan view showing a sub-chassis used in the reel drive mechanism of FIG. 7.
Figure 11:
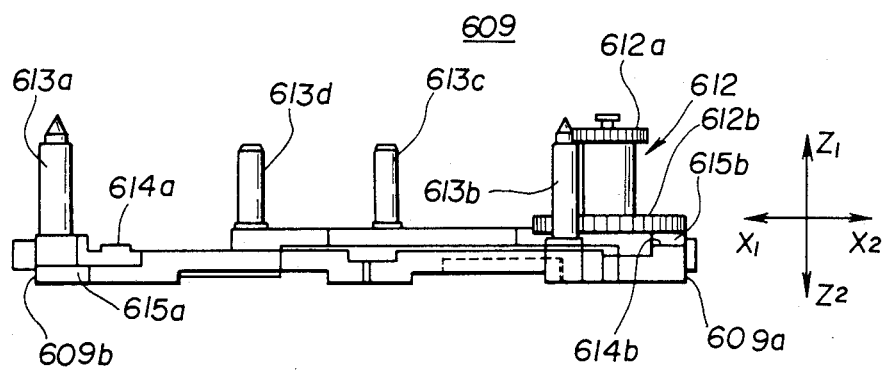
FIG. 11 is a front view of the sub-chassis in FIG. 10.

Apart from the positioning pins 613a-613d already described, the sub-chassis 609 further carries position restricting parts 614a-614d for determining the position of the sub-chassis 609 relative to the main chassis 500 in the vertical direction indicated by arrows $Z_1$ and $Z_2$ (FIG. 11) when the sub-chassis 609 is raised. The sub-chassis 609 also carries position restricting parts 615a and 615b for determining the position of the sub-chassis 609 relative to the main chassis 500 in the horizontal direction indicated by arrows $Y_1$ and $Y_2$ (FIG. 10). The position restricting parts 614a-614d and the position restricting parts 615a and 615b will be described later in more detail.

Figure 7:
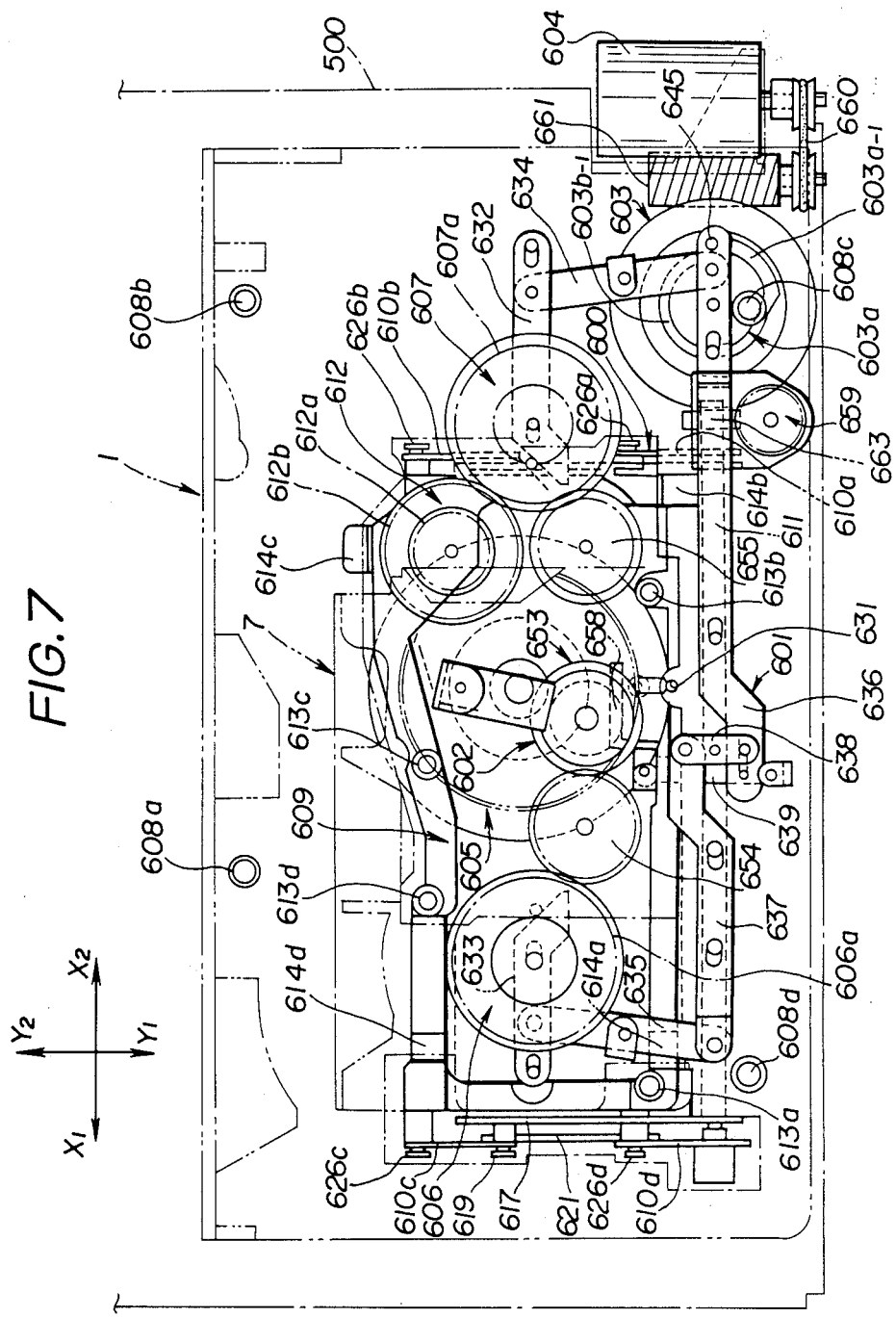
FIG. 7 is an enlarged plan view showing details of reel drive mechanism.
Figure 9:
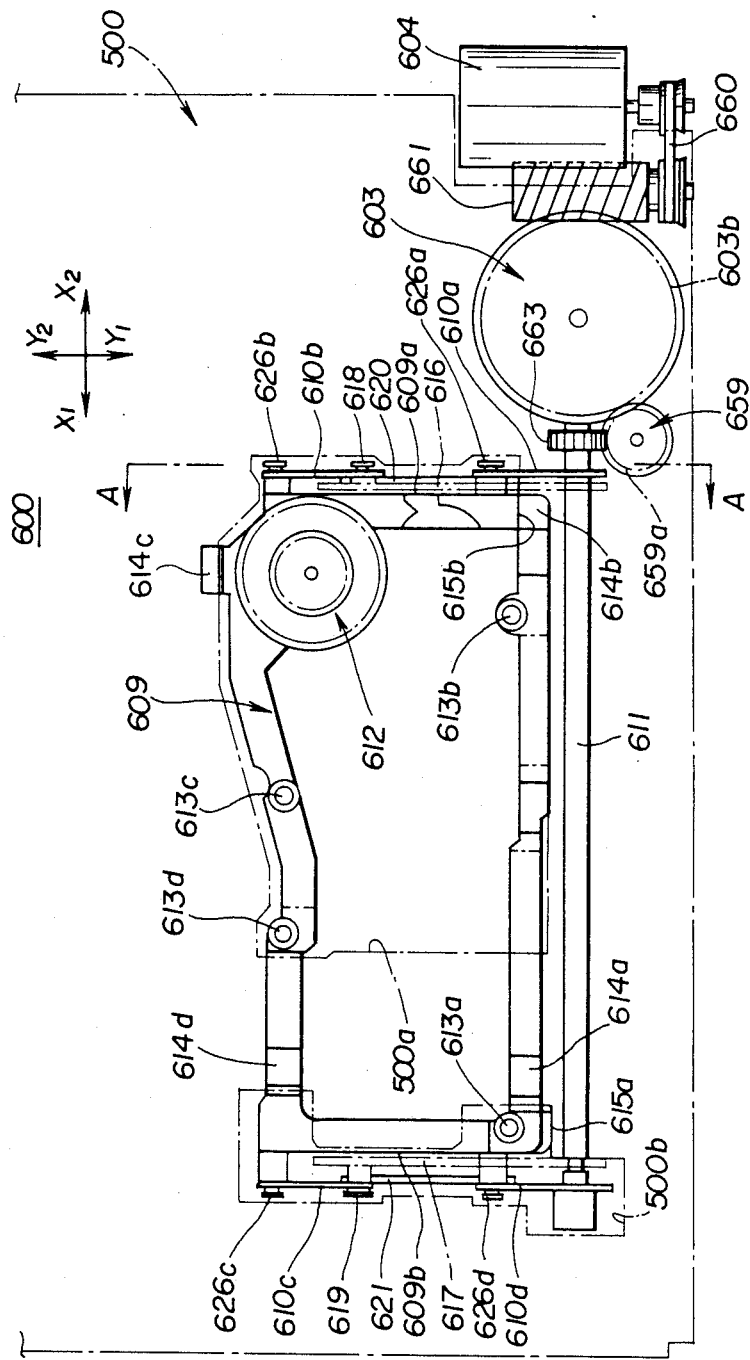
FIG. 9 is a diagram for explaining the essential part of a sub-chassis driving mechanism.
Figure 12:
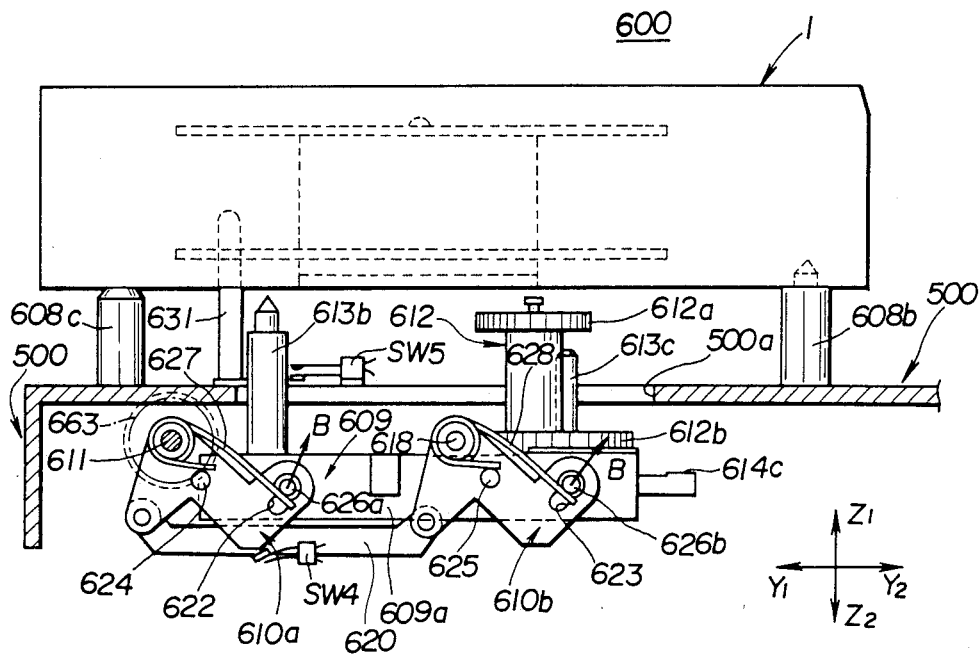
FIG. 12 is a side view showing the sub-chassis driving mechanism in a state for loading a compact size tape cassette.
Figure 13:
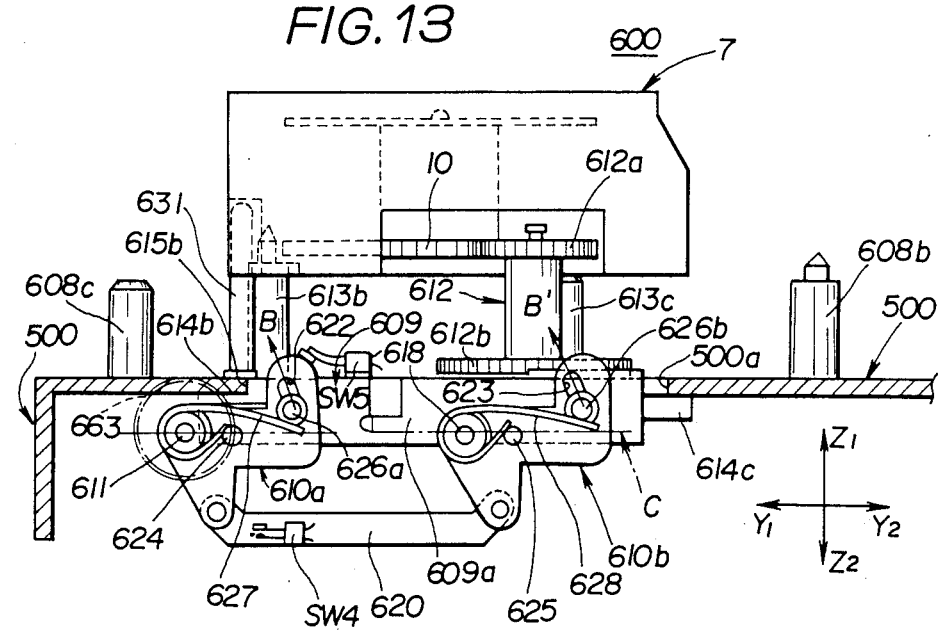
FIG. 13 is a side view showing the state of the sub-chassis driving mechanism when the sub-chassis is in the state shown in FIG. 12.

The sub-chassis 609 is connected to the main chassis 500 by elevating levers 610a-610d. The elevating levers 610a-610d carry the sub-chassis 609 in a movable manner upwards and downwards. The elevating levers 610a-610d mounted on a side wall of shorter frame portions 609a and 609b of the sub-chassis 609 as shown in FIGS. 7 and 9 and carry four corners of the rectangular sub-chassis 609. As the construction of the elevating levers 610a–610d is identical in the frame portions 609a and 609b, only the elevating levers 610a and 610b will be described with reference to FIGS. 12 and 13 which are end views of the sub-chassis 609 viewed from the direction indicated by arrows A—A in FIG. 9 and the description for the elevating levers 610c and 610d will be omitted. Referring to FIGS. 12 and 13, the elevating levers 610a and 610b are made of a generally L-shaped plate member and are disposed on the side wall of the frame portion 609a. The elevating levers 610a are mounted on the frame portions 609a by a rotary shaft 611 which is held rotatably on the frame portion 609a so that the lever 610a is rotated unitarily with the shaft 611. The rotary shaft 611 is driven by the sub-chassis driving mechanism 600 to be described. The elevating lever 610b on the other hand is held rotatably on a pin 618 which is fixed on a holding part 616 (FIG. 9) which in turn is a part of the main chassis 500. Similarly, the lever 610c is rotatably held on a pin 619 which is fixed on the holding part 617 of the main chassis 500 and the lever 610d is held by the rotary shaft 611 and is driven responsive to the rotation of the motor 604. The levers 610a and 610b are connected by a link 620 and are moved simultaneously. Similarly, the levers 610c and 610d are connected by a link 621 and are moved simultaneously. The elevating levers 610a and 610b further have elongated holes 622 and 623 and a pair of projections 624 and 625. The holes 622 and 623 accept pins 626a and 626b provided on the portion 609a of the sub-chassis 609 and springs 627 and 628 are held between the pin 626a and the projection 624, and between the pin 626b and the projection 625, respectively. In other words, the sub-chassis 609 is urged in the upward direction as indicated by an arrow B in FIG. 12 when in the STANDARD mode and as indicated by an arrow B' in FIG. 13 when in the COMPACT mode.

In the COMPACT mode shown in FIG. 13, the chassis 609 is urged in the direction indicated by the arrow B as shown in FIG. 12 as a result of the action of the springs 627 and 628. Further, the sub-chassis 609 carries on its upper surface restricting parts 614a–614d, 615a and 615b (see FIGS. 9-11). The restricting parts 614a–614d make contact with a lower surface of the main chassis 500 in the COMPACT mode and restrict the movement of the main chassis in the vertical direction. Further, the restricting parts 615a and 615b make contact with edges of the cutouts 500a and 500b extending in the $Y_1$ direction and restrict the movement of the sub-chassis 609 in the horizontal direction shown by the arrows $Y_1$ and $Y_2$ (FIG. 9). As the sub-chassis 609 is urged in the direction shown by the arrow B by the springs 627 and 628, the urging force exerted by the spring has decomposed into force components working in the $Z_1$ direction and in the $Y_1$ direction. The urging force component in the $Z_1$ direction urges the position restricting parts 614a–614d to the lower surface of the main chassis 500 and the urging force component in the $Y_1$ direction urges the position restricting parts 615a and 615b to the aforementioned edge of the cutouts 500a and 500b. It should be noted that the restriction of the movement of the sub-chassis 609 in the direction indicated by the arrows $X_1$ and $X_2$ is achieved by the elevating levers 610a–610d and the holding parts 616 and 617. Thus, the sub-chassis 609 in the raised state as shown in FIG. 13 is restricted from movement in the X, Y and Z directions. In other words, the position of the sub-chassis 609 is strictly determined relative to the main chassis 500. As a result of the positioning of the sub-chassis 609 relative to the main chassis 500, the position of the compact size tape cassette 7 supported by the positioning pins 613a–613d on the sub-chassis 609 is also determined without ambiguity. As already described, all of the positioning pins 613a–613d are carried on the common sub-chassis 609. Thus, the relative position of the positioning pins 613a–613d is maintained unchanged even if the sub-chassis 609 is moved up and down. In other words, the compact size tape cassette 7 is held on the cassette tray 300 precisely when the cassette loading mechanism is in the C state shown in FIG. 3(C) and the tape cassette loading system is in the COMPACT mode. Thus, the loading of the compact size tape cassette is performed smoothly when playing the compact size tape cassette in the video tape recorder. The positioning of the standard size tape cassette 1 in the STANDARD mode of the tape cassette loading system is made by the positioning pins 608a–608d. As the pins 608a–608d are formed on the main chassis 500, their mutual positions are not changed.

Figure 8:
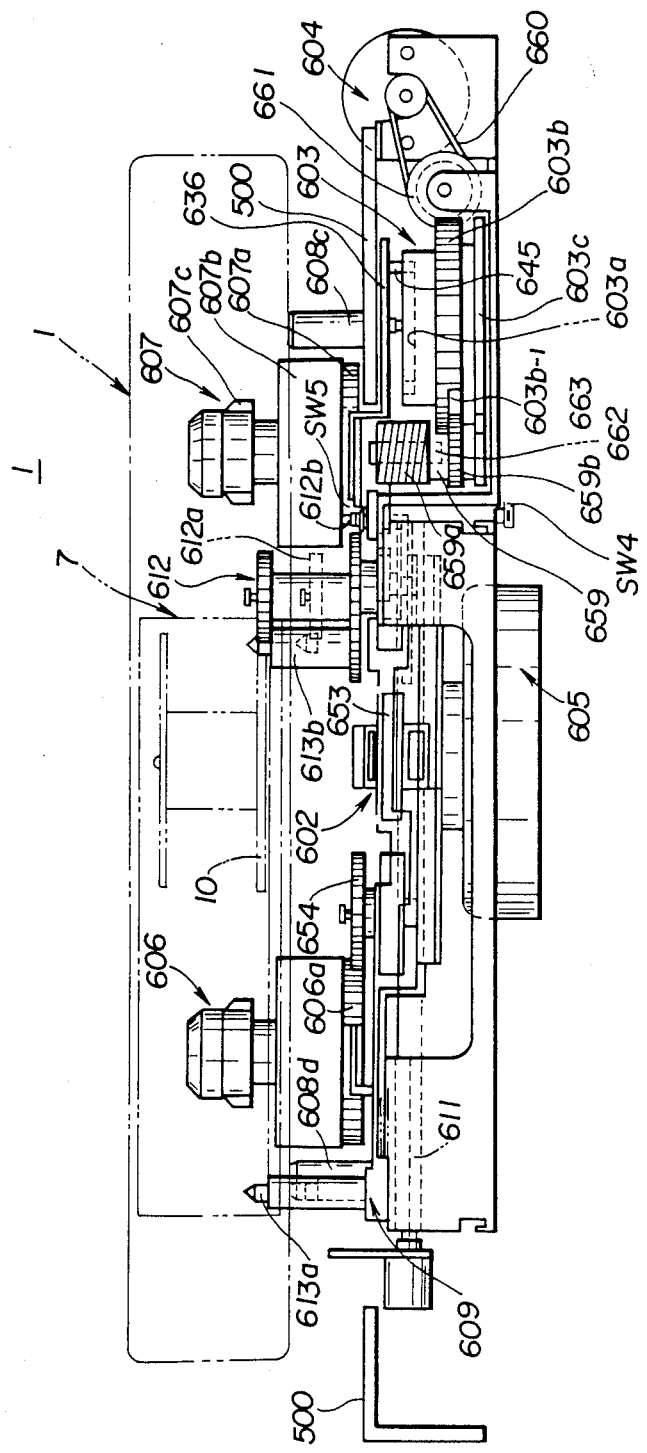
FIG. 8 is a side view showing the reel drive mechanism of FIG. 7.

The reel drive mechanism in FIG. 6 further comprises a sub-chassis driving mechanism 600 for driving the sub-chassis 609 up and down, a reel brake driving mechanism 601 for braking the rotation of the reels in the tape cassette, and a reel driving section 602 for driving the reel disks 606 and 607. Referring to FIGS. 7 and 8, the sub-chassis driving mechanism 600 and the reel brake driving mechanism 601 are driven by a main cam gear 603 which in turn is driven by a motor 604. Further, the reel driving section 602 selectively transmits the rotation of a reel motor 605 to either one of the reel disks 606 and 607. In the description below, the mechanisms 600, 601 and 602 will be described individually.

First, sub-chassis driving mechanism 600 is described with reference to FIGS. 12 and 13. The sub-chassis driving mechanism generally comprises the sub-chassis 609, the elevating levers 610a–610d and the rotary shaft 611. The sub-chassis driving mechanism 600 is driven by the motor 604 which causes the rotation of the rotary shaft 611. The motor 604 drives the main cam gear 603, and the main cam gear 603 drives the gear 663 connected to the shaft 611. The transmission of the rotation of the motor 604 to the shaft 611 will be described later. Referring to FIGS. 12 and 13, responsive to the rotation of the shaft 611, the elevating levers 610a and 610b connected to each other by the links 620 and the elevating levers 610c and 610d connected to each other by the links 621 are rotated simultaneously. Thus, the sub-chassis 609 is raised or lowered. During this movement, the sub-chassis 609 is maintained horizontal. FIG. 13 shows the state in which the sub-chassis 609 is fully raised by the sub-chassis driving mechanism 600 to the UP state of the reel driving means. In this state, it should be noted that the toothed part 612b of the drive gear 612 is engaged with the toothed gear part 607a of the reel disk 607 for driving the take up reel of the standard size tape cassette (see FIG. 8). The completion of the movement of the sub-chassis 609 to the fully raised state is detected by a sub-chassis detection switch SW5 provided at a rear side of the main chassis 500. On the other hand, the completion of the movement of the sub-chassis 609 to the fully lowered state is detected by a sub-chassis detection switch SW4 disposed below the main chassis 500.

In the state shown in FIG. 13 the pins 626a and 626b are located at a level higher than a line C which is a hypothetical line connecting the rotary shaft 611 and the pin 618. It should be noted that during such movement of the sub-chassis 609, the drive gear 612 comprising the toothed part 612a and the toothed part 612b of the drive gear 612 is moved along a curved path including a horizontal velocity component, and the toothed parts 612a and 612b are engaged with the tooth 10a of the take up reel 10 of the compact size tape cassette 7 and the toothed gear part 607a of the reel disk 607 not from the direction immediately below the reel disk 607 but from a direction slightly offset sideways in the $Y_1$ direction when the sub-chassis 609 is raised. As a result, the gear 612 is smoothly engaged with the reel disk 607 and the take up reel of the compact size tape cassette and the risk of jamming of the gear is eliminated. For the sake of comparison, a case is considered below in which the sub-chassis 609 is moved only in the vertical direction indicated by the arrows $Z_1$ and $Z_2$. In such a case, there is a substantial risk that the teeth 10a of the take up reel 10, the toothed parts 612a and 612b of the drive gear, and the toothed part 607a of the reel disk 607 do not mesh properly, in the worst case, the ascent or descent of the sub-chassis 609 becomes totally impossible. In contrast, the present invention avoids such a problem by engaging the drive gear 612 to the reel disk 607 from a direction slightly offset sideways.

Figure 14:
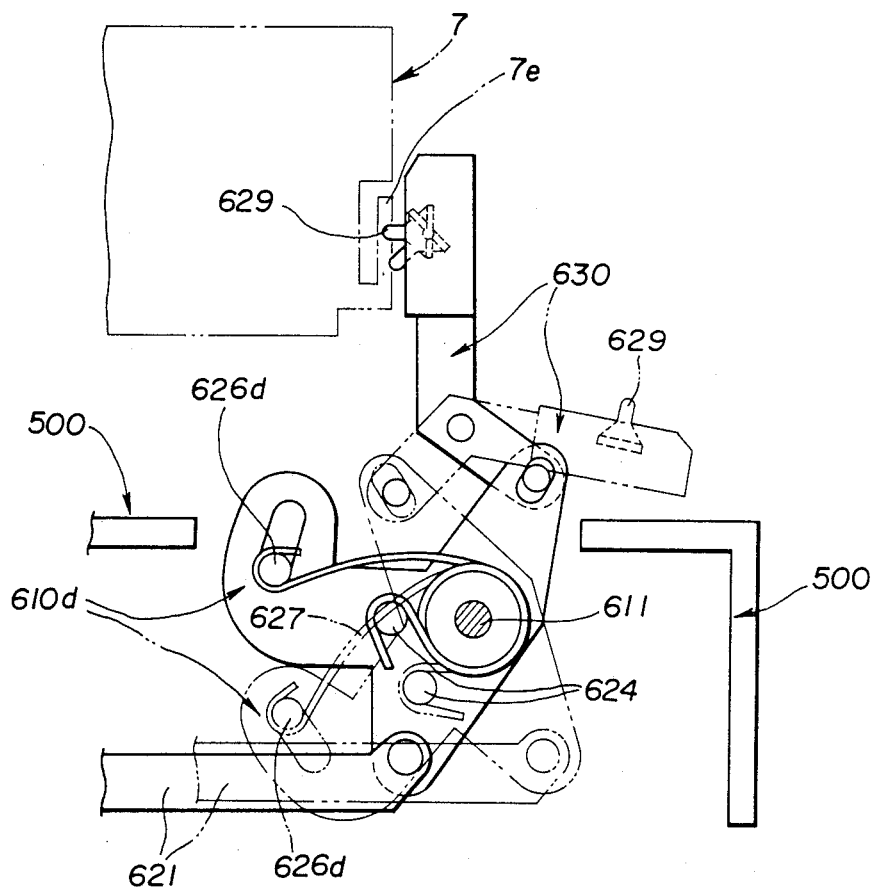
FIG. 14 is a diagram for explaining a movement of a sensor for protection against erroneous erasing and a lever member carrying the sensor.
Figure 19:
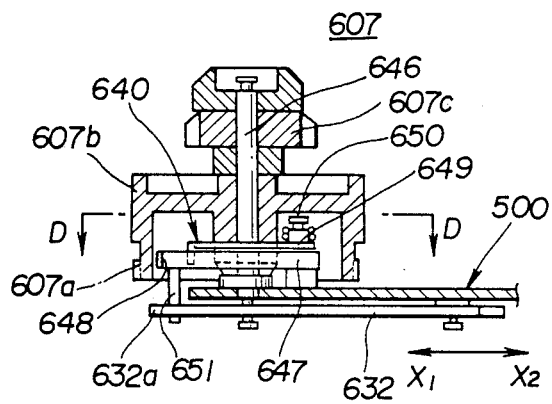
FIG. 19 is a longitudinal cross sectional view showing a structure of a take up side reel disk.

Generally, the tape cassette carries a tab which can be broken off for preventing erroneous recording or erasing of previously recorded programs. When this tab is broken off, the video tape recorder is prevented from performing recording. The compact size tape cassette as shown in FIG. 1(B) also has such a tab on its side wall as more clearly shown in FIG. 14 by a tab 7e. The tape cassette loading system of the present invention further comprises a detector 629 for detecting the existence or non-existence of the tab 7e. As the tab 7e is located at a level higher than the level of the bottom of the compact size tape cassette 7, the detector 629 should be located at a correspondingly high level position. However, there arises a problem in that if the detector 629 is provided on the sub-chassis 609 together with the positioning pins 613a-613d, the detector 629 is engaged with the bottom of the standard size tape cassette 1 when the tape cassette loading system is in the STANDARD state due to the height of the detector 629. In order to solve this problem, the tape cassette loading system of the present invention uses the detector 629 which is mounted at an end of a lever 630 which is mounted rotatably on the main chassis 500. Further, the other end of the lever 630 is connected the L-shaped lever 610d. Thus, when the tape cassette loading system is in the STANDARD state, the detector 629 assumes a disengaged state as shown in FIG. 19 by a broken line. It should be realized that FIG. 19 shows the frame portion 609b shown from the left in FIG. 9. In this position, the detector 629 does not obstruct the loading of the standard size tape cassette. Of course, the detector 629 may be held by any of the levers 610a- 610d depending on the position where the tab 7e is provided. Responsive to the rotation of the shaft 11 in the clockwise direction, the lever 610d is rotated in the clockwise direction and the lever 630 is swung in the counterclockwise direction. As a result, the detector 629 is moved to the position shown by the solid line in FIG. 19 where the detector 629 faces the tab 7e on the tape cassette 7. Thus, the detector 629 does not obstruct the operation of the video tape recorder playing the standard size tape cassette 1.

Next, the reel brake driving mechanism 601 will be described with reference to FIGS. 15-18. Reel brake driving mechanism 601 generally comprises a link mechanism including brake levers 632, 633 and link members 634-639 connected to the brake levers 632 and 633, and brake mechanisms 640 and 641 respectively accommodated in the reel disks 606 and 607. As the construction of the brake mechanism 640 and that of the brake mechanism 641 are identical, only the brake mechanism 640 is illustrated and the illustration of the brake mechanism 641 will be omitted. The reel brake driving mechanism 601 is driven by the main cam gear 603.

Figure 15:
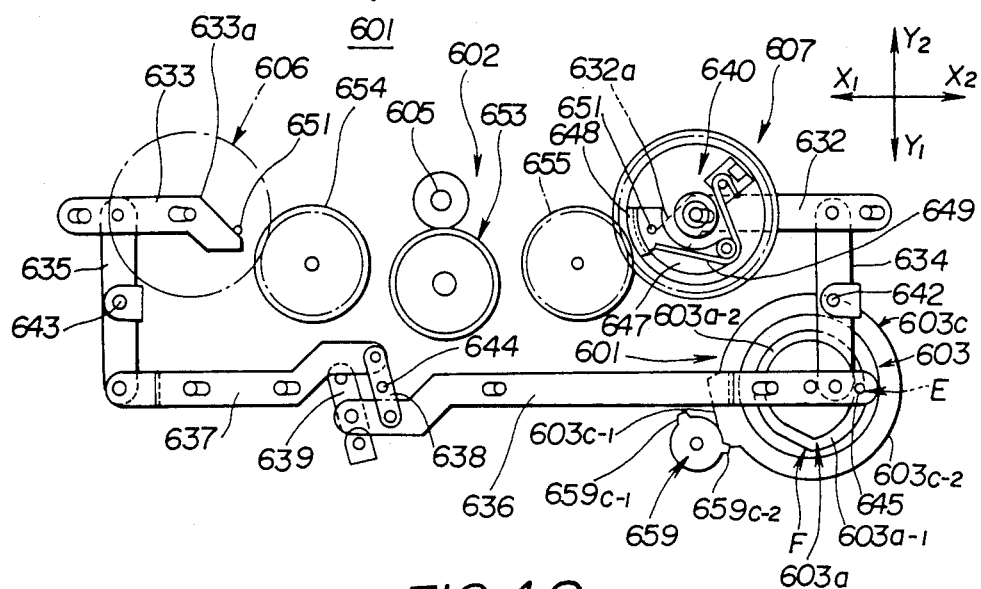
FIG. 15 is a diagram showing an essential part of a reel brake driving mechanism of a reel brake for a case when the cassette loading system is in a state for loading a standard size tape cassette and further in a state in which the reel brake is engaged.

Referring to FIG. 15, the brake levers 632, 633 and the link members 636 and 637 are movable in the direction shown by the arrows $X_1$ and $X_2$. The link member 634 is a member having an end connected to the brake lever 632 in a rotatable manner and the other end connected to the link member 636 also in a rotatable manner. Further, the central part of the link member 634 is held by a pin 642 fixed to the main chassis 500. The link member 635 is similarly connected to the brake lever 633 and the link member 637 and the central part of the link member 635 is held by a pin 643 fixed on the main chassis 500. The link members 636 and 637 are connected to each other by link members 638 and 639, and the central part of the link member 638 is held rotatably by a pin 644 provided on the main chassis 500. Further, at an end of the link member 636 towards the $X_2$ direction, a cam pin 645 projecting in the downward direction is provided. This cam pin 645 is engaged with a cam groove 603a formed on an upper surface of the main cam gear 603. Further, a slope 632a is provided at an end of the brake lever 632 towards the $X_1$ direction and a slope 633a is formed at an end of the brake lever 633a. The aforementioned link mechanism moves the brake lever 632 in the $X_1$ direction and the brake lever 633 in the $X_2$ direction responsive to the displacement of the cam pin 645 in the $X_2$ direction. In other words, the brake lever 632 is moved in the $X_1$ direction and the brake lever 633 is moved in the $X_2$ direction when the cam pin 645 is engaged with a large diameter part $603_{a-1}$ of the cam groove 603a, and the brake lever 632 is moved in the $X_2$ direction and the brake lever 633 is moved in the $X_1$ direction when the cam pin 645 is engaged with a small diameter part $603_{a-2}$ of the cam groove 603a. In the latter state, the distance between the brake levers 632 and 633 is increased.

Next, brake mechanisms 640 and 641 will be described. As aforementioned, the brake mechanism 640 and the brake mechanism 641 have an identical construction (except for the fact that the arrangement of the components in the brake mechanism 641 is symmetrical to the arrangement in the brake mechanism 642), only the brake mechanism 640 will be described with reference to FIGS. 19 and 20 and the description of the brake mechanism 641 will be omitted.

Figure 20:
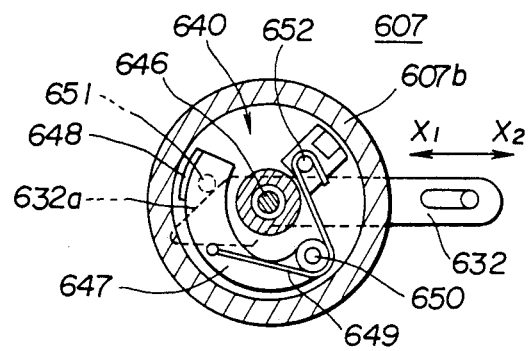
FIG. 20 is a cross sectional view of the reel disk in FIG. 19 along a line D—D.

Referring to FIGS. 19 and 20, the brake mechanism 640 is provided on the main chassis 500 at a portion inside the reel disk 607. The reel disk 607 comprises disk body 607b and a hub 607c formed unitarily with the body 607b, and the reel body 607b and the hub 607c are held rotatably by a shaft 646 provided on the main chassis 500. At a lower part of the body 607b, there is provided the aforementioned toothed gear part 607a. The reel disk 607 is rotated as a result of driving the toothed gear part 607a.

The reel body 607b is a hollow member and defines a space inside the reel body 607b and the brake mechanism 640 is disposed in this space. The brake mechanism 640 comprises a brake arm 647, brake shoe 648, spring 649 and the brake lever 632. The brake arm 647 is held rotatably on a pin 650 provided on the main chassis 500 and carrying the brake shoe 648 which may be a rubber brake shoe so as to face an inner wall of the reel body 607b. Further, the brake arm 647 carries a brake pin 651 on its bottom, and the brake pin 651 is engaged with the slope 634 formed on the brake lever 632 which in turn is located below the main chassis 500. The spring 649 has an end connected to the brake arm 647 and the other end connected to a pin 652 provided on the main chassis 500. As a result of the force exerted by the spring 649, the brake arm 647 is constantly urged so as to engage the brake shoe 648 with the inner wall of the reel body 607b. Thus, when the brake lever 632 is moved in the $X_1$ direction, the brake pin 651 is displaced along the slope 632a in the upper direction in the plane of FIG. 20 and the brake shoe 648 is separated from the inner wall of the reel body 607b. In this state, the brake of the reel is disengaged. On the other hand, when the brake lever 632 is displaced in the $X_2$ direction, the brake pin 651 is displaced in the downward direction in the plane of FIG. 20, and the brake shoe 648 is urged to the inner wall of the reel body 607b by the spring 649 and the brake is engaged.

In the brake mechanism 640 described heretofore, the components constituting the brake mechanism 640 are accommodated in the reel disk 607 for the take up reel. In other words, the components of the reel drive mechanism located outside of the reel disk 607 are eliminated and the structure around the reel disk 607 is simplified. As a result, a compact construction of the reel drive mechanism of the tape cassette loading system is possible. Further, the brake mechanism 640 is protected from dust by the reel disk body 607b and the main chassis 500. As a result, the penetration of dust into the brake shoe 648 is prevented and the braking of the reel disk can be reliably achieved. As already described with reference to FIG. 15, the brake levers 632 and 633 are displaced responsive to the engagement of the cam pin 645 with the large diameter part $603_{a-1}$ and the small diameter part $603_{a-2}$ of the cam groove 603a. Thus, the engagement and disengagement of the brake are controlled by the rotation of the main cam gear 603.

Next, the reel drive section 602 of the reel drive mechanism will be described with reference to FIG. 21. As can be seen in FIG. 7, the reel drive section 602 is generally disposed in the cutout 500a of the main chassis 500 between the reel disk 606 and the reel disk 607. As can be seen in the drawing, the reel drive section 602 of the reel drive mechanism generally comprises the reel motor 605 for driving the reel disks 606 and 607, an idling gear 653 held on a swing arm, a supply side intervening gear member 654, and a take up side intervening gear member 655. The reel motor 605 is a motor mounted on a reel motor bracket 656 which is in turn fixed to the main chassis 500. The reel motor bracket 656 further carries the idling gear 653 and the intervening gear members 654 and 655. Further, the intervening gear members 654 and 655 are meshed with respective toothed reel gear parts 606a and 607a of the reel disk 606 and 607. The aforementioned idling gear 653 carried by a swing arm is moved so as to engage selectively with either one of the intervening gear members 654 and 655 and transmits the rotation of the reel motor 605 to the reel disk 606 or 607 responsive to the direction of the tape transportation.

Figure 21:
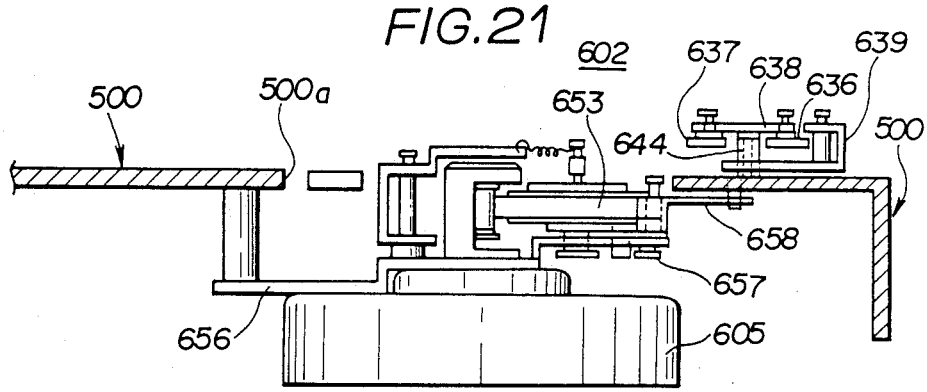
FIG. 21 is a diagram for explaining control of a swinging motion of an idling member.

Referring to FIG. 21, the idling gear 653 carries a pin 657 which is connected with the link members 636 and 637 constituting the reel brake mechanism 601 by a connection bar 658 (FIG. 7). Thus, as a result of the movement of the link members 636 and 637, the connection bar 658 is displaced and the idling gear 653 is moved either to a position for engagement with the reel disk 606 or to a position for engagement with the reel disk 607. As a result of this construction, the transmission of the rotation of the reel motor 605 to the reel disk 606 or 607 is immediately interrupted.

Next, the construction of the main cam gear 603 and the sub-cam gear 659 engaging with the main cam gear 603 and the operation of the mechanisms 601 and 602 related to the construction of these cam gears will be described. Referring to FIG. 8, the main cam 603 is mounted rotatably on a small chassis 662 fixed on the main chassis 500. As already described, the main cam gear 603 carries cam groove 603a to which the aforementioned cam pin 645 is engaged. Below the cam groove 603, there is formed a tooth 603b, and further below the tooth 603b, there is formed a slide cam part 603c. As already described, the cam groove 603a comprises a larger diameter part $603_{a-1}$ and a smaller diameter part $603_{a-2}$ as can be seen in FIGS. 15-18. Thus, the cam parts $603_{a-1}$ and $603_{a-2}$ are connected and the cam groove 603a has a closed configuration. Further, the tooth 603b of the main cam gear 603 has a cutout part $603_{b-1}$ shown in FIG. 8 for a predetermined angular range, and the main cam gear drives the sub-cam bear 659 only intermittently. Further, the slide cam part 603c has a cam surface its outer periphery as can be seen in FIGS. 15-18, in which the cam surface comprises a projecting part $603_{c-1}$ and a normal diameter part $603_{c-2}$. The main cam gear 603 is driven by the cam motor 604.

The rotation of the cam motor 604 is transmitted as shown in FIG. 7 to the worm gear 661 via the belt and pulley mechanism 660. The worm gear 661 is meshed with the tooth 603b of the main cam gear 603, and the main cam gear 603 is driven by the motor 604. The sub-cam gear 659 is held rotatably on the small chassis 662 and carries an upper worm gear part 659a, a tooth 659b below the worm gear part 659z, and a small cam part 659c below the small cam part 659c as can be seen in FIG. 8. The worm gear part 659a is meshed with the gear 663 on the rotary shaft 611 and moves the sub-chassis 609 up and down by rotating the rotary shaft 611 as already described. The tooth 659b of the sub-cam gear 659 is engaged with the tooth 603b of the main cam gear 603 except for the case in which the tooth 659b is accepted in the aforementioned cutout part $603_{b-1}$. Thus, the sub-cam gear 659 is rotated only when the tooth 659b is meshed with the tooth 603b of the main cam gear 603 and is not rotated when the tooth 659b is accepted in the cutout $603_{b-1}$ of the main cam gear 603.

The small cam part 659c is formed so as to face the slide cam part 603c on the main cam gear 603. Further, the small cam part 659c carries a pair of projections $659_{c-1}$ and $659_{c-2}$ as clearly shown in FIGS. 15-18. These projections are provided so as to engage with a projecting part $603_{c-1}$ of the slide cam part 603c, and when the projections $659_{c-1}$ and $659_{c-2}$ are engaged with the projecting part $603_{c-1}$, the rotation of the sub-cam gear 659 is prevented. On the other hand, as the projecting part $603_{c-1}$ is formed on the main cam gear 603 so as to coincide with the cutout part $603_{b-1}$, the main cam gear is freely rotatable even when the projection $659_{c-1}$ or $659_{c-2}$ is engaged with the projecting part $603_{c-1}$, and the rotation of the small cam gear 659 is restricted.

Figure 16:
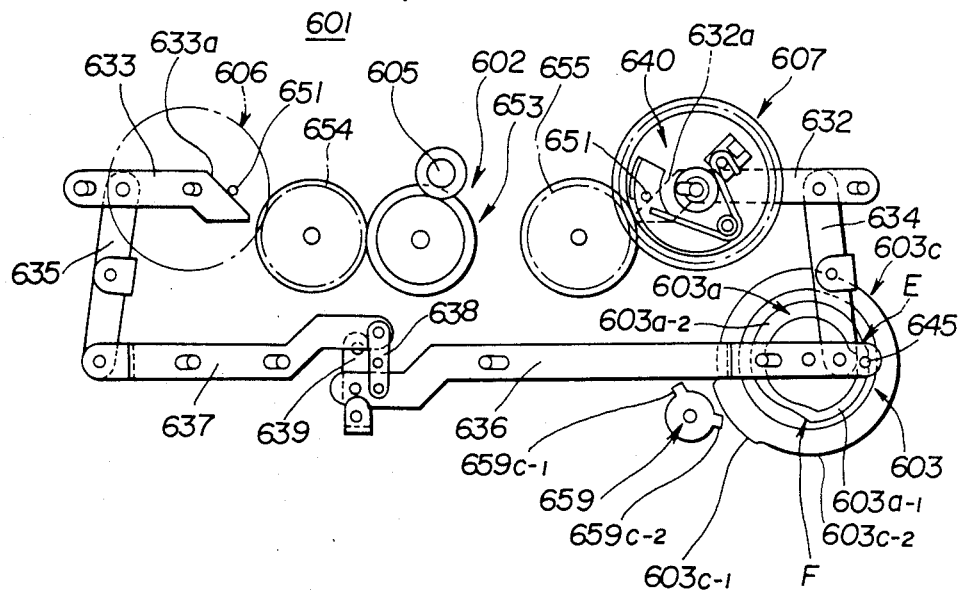
FIG. 16 is a diagram showing the essential part of the reel brake driving mechanism of the reel brake for a case when the cassette loading system is in the state for loading the standard size tape cassette and further in a state in which the reel brake is disengaged.

Next, the operation of the sub-cam gear 659 and the operation of the mechanisms 600 and 601 associated therewith responsive to the rotation of the main cam gear 603 will be described. In the description heretofore, the operation associated with the change in the mode of the tape cassette loading system from the STANDARD mode to the COMPACT mode will be described. FIGS. 12, 15 and 16 show the STANDARD state of the tape cassette loading system of the present invention. In the STANDARD mode, the sub-chassis 609 is moved to the lowered state as shown in FIG. 12. Further, as can be seen in FIG. 15, the projections $659_{c-1}$ and $659_{c-2}$ on the small cam part $659c$ of the sub-cam gear 659 are engaged with the projecting part $603_{c-1}$ on the slide cam $603c$. Thus, in this state, the rotation of the sub-cam gear 659 is prevented. Responsive to the restriction of the movement of the sub-cam gear 659, the transmission of the rotation of the main cam gear 603 to the gear 663 for rotating the rotary shaft 611 is interrupted. As the rotation of the rotary shaft 611 controls the up/down movement of the sub-chassis 609, the sub-chassis 609 is not raised or lowered as long as the projections on the sub-cam gear 659 are engaged with the slide cam part $603c$ of the main cam gear 603. In other words, the sub-chassis 609 is stationary in the lowered state even if the motor 604 is rotated.

Next, the control of the reel brake driving mechanism 601 by the main cam gear 603 will be described. As already described, the engagement and disengagement of the brake are achieved by displacing the cam pin 645 in the $X_1$ or $X_2$ direction. This engagement or disengagement of the brake should be performed when the sub-chassis 609 is stationary in the UP state or DOWN state. In order to operate the cam pin 645 when the sub-chassis 609 is held stationary in the DOWN state in correspondence to the STANDARD mode, a deformed part E is provided on the cam groove $603a$ at a portion of the main cam gear 603 so that the pin 645 is engaged with the deformed part E when the projecting part $603_{c-1}$ is engaged with the projection $659_{c-1}$ or the projection $659_{c-2}$ of the sub-cam gear 659. The deformed part E is defined as a portion which connects the large diameter cam groove part $603_{c-1}$ with the small diameter cam groove part $603_{c-2}$. As the movement of the pin 645 occurs when the pin 645 is engaged with the deflected part E, the cam gear 603 carrying the cam groove $603c$ having the pattern described above operates the reel brake driving mechanism 601 such that the brake is applied or released only when the rotation of the rotary shaft 611 and hence the movement of the sub-chassis 609 is prevented. FIG. 16 shows a state in which the brake is disengaged in the STANDARD mode. When changing the state of the tape cassette loading system from the STANDARD mode to the COMPACT mode, the main cam gear 603 is rotated in the clockwise direction from the state shown in FIG. 15 to the state shown in FIG. 16. As a result of the rotation of the main cam gear 603, the projections $659_{c-1}$ and $659_{c-2}$ are disengaged from the projected part $603_{c-1}$. At the same time, the tooth $603b$ of the main cam gear 603 and the tooth $659b$ of the sub-cam gear 659 are engaged. Thus, the rotation of the main cam gear $603a$ is transmitted to the sub-cam gear 659 and the sub-chassis 609 is moved in the upward direction. In this state, the cam pin 645 is engaged with the smaller diameter cam groove part $603a-2$ and the brake is applied to the reel disks 606 and 607. Thus, the unwanted rotation of the reels of the tape cassette during the transition of the state of the tape cassette loading system is prevented. With continuing rotation of the main cam gear 603, the sub-chassis 609 is raised continuously. The cam gear $603c$ on the main cam gear 603 is formed with another deformed part F such that the cam pin 645 is engaged with the part F when the drive gear 612 carried by the sub-chassis has reached a position defined by a state just prior to engagement with the tooth $607a$ of the reel disk 607. The deformed part F is a part defined as a portion which connects the small diameter cam groove part $603_{c-2}$ with the larger diameter cam groove part $603_{c-1}$. Thus, the reel brake driving mechanism 601 is operated and the brake of the reel disks 606 and 607 is disengaged. As a result, the reel disks 606 and 607 are free to rotate immediately before the engagement of the drive gear 612 and the reel disk 607. Thus, the reel disk 607 rotates by a minute amount upon engagement, and the tooth $612b$ of the drive 612 and the tooth $607a$ of the reel disk 607 are meshed smoothly.

Figure 17:
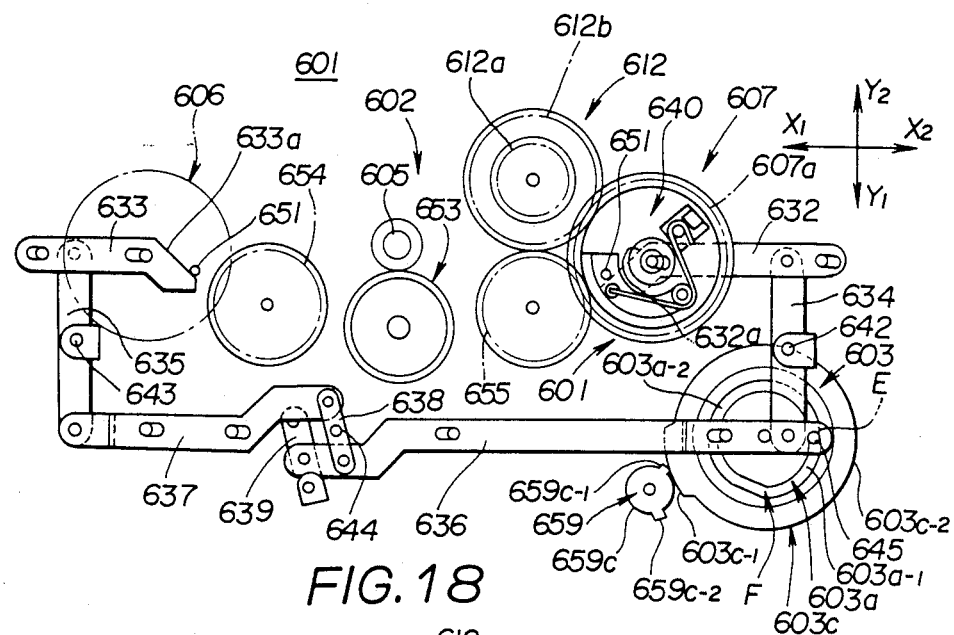
FIG. 17 is a diagram showing the essential part of the reel brake driving mechanism of the reel brake for a case when the cassette loading system is in a state for loading the compact size tape cassette and further in a state in which the reel brake is engaged.
Figure 18:
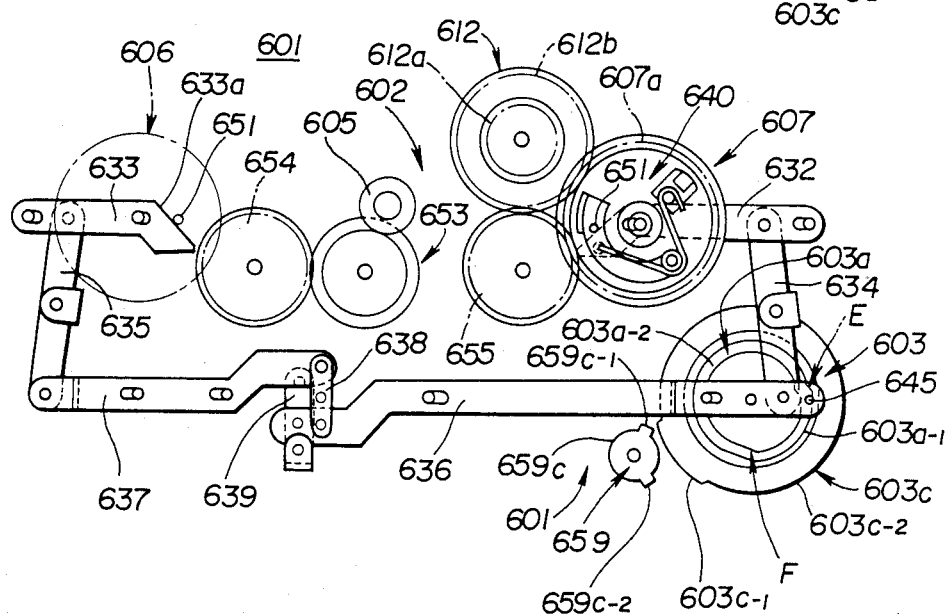
FIG. 18 is a diagram showing the essential part of the reel brake driving mechanism of the reel brake for the case when the cassette loading system is in the state for loading the compact size tape cassette and further in a state in which the reel brake is disengaged.

FIGS. 13, 17 and 18 show the reel brake driving mechanism 601 in the COMPACT mode. It should be noted that the sub-chassis driving mechanism 600 is designed such that the transition from the STANDARD mode to the COMPACT mode is completed responsive to one full rotation (360°) of the main cam gear 603. Further, the sub-cam gear 659 is designed to assume a state in which the projections $659_{c-1}$ and $659_{c-2}$ engage with the projected part $603_{c-1}$ of the main cam gear 603. In other words, the relation between the main cam gear 603 and the sub-cam gear 659, and the state of the reel brake driving mechanism 601 are identical to those in the case of the STANDARD mode. Thus, the rotation of the sub-cam gear 659 is prohibited as a result of the engagement of the projections $659_{c-1}$ and $659_{c-2}$ with the projected part $603_{c-1}$ of the main cam gear 603. As a result, the sub-chassis 609 is held stationary at the UP state even if the main cam gear 603 is rotated further. In this state, the cam pin 45 is engaged with the deflected part E of the cam groove $603c$ and can be engaged with any of the cam groove part $603_{1-1}$ and $603_{a-2}$ with a minute rotation of the cam gear 603. Thus, one can achieve the engagement and disengagement of brake with the reel disk 606 and 607 as is desired. It should be noted that FIG. 18 shows the state of the reel brake driving mechanism in which the brake is released in the COMPACT mode.

As described heretofore, the reel drive mechanism of the tape cassette loading system of the present invention can freely apply and release the brake to the reel disks while using a single cam groove $603a$. Thus, one can make the main cam gear 603 compact. Further, a common reel brake driving mechanism can be used for the compact size tape cassette and for the standard size tape cassette. Thus, the construction of the tape cassette loading system of the present invention is simplified. Furthermore, the braking of the reel disk 606 and the reel disk 607 can be achieved by controlling the single main cam gear 603. The description for the transition from the COMPACT mode to the STANDARD mode is omitted as the operation is an exact reversal of the operation described already.

Next, the tape loading mechanism used in the tape cassette loading system of the present invention will be described with reference to FIG. 22. The tape loading mechanism comprises a main chassis 700 on which is carried a guide drum 800 which forms a part of the recording and reproducing system of the video tape recorder, and the guide drum 800 carries in turn a plurality of magnetic heads (not shown). Further, the main chassis 700 is formed with a first guide groove 701a along the guide drum 800 at a left hand side and a second guide groove 701b at a right hand side of the guide drum 800. The guide groove 701a guides a first base member 704a provided with a guide roller 702a and an inclined pole 703a which are used for drawing out the magnetic tape from the tape cassette and for wrapping the magnetic tape around the guide drum 800. The guide groove 701b on the other hand guides a second base member 704b provided with a guide roller 702b and an inclined pole 703b for drawing out the magnetic tape from the tape cassette and for wrapping the magnetic tape around the guide drum 800. Furthermore, the main chassis 700 carries a swing arm 705 on which is provided a guide pole 705a for drawing out the magnetic tape from the compact size tape cassette 7 to a predetermined position for loading the magnetic tape, other arms 706 and 707 on which are provided poles 706a and 707a for drawing out the magnetic tape from the tape cassette to a half loading state in which the magnetic tape makes a tangential contact with the guide drum 800, and still another arm 708 on which a tension pole 708a for providing a predetermined tension to the magnetic tape is provided.

Figure 22:
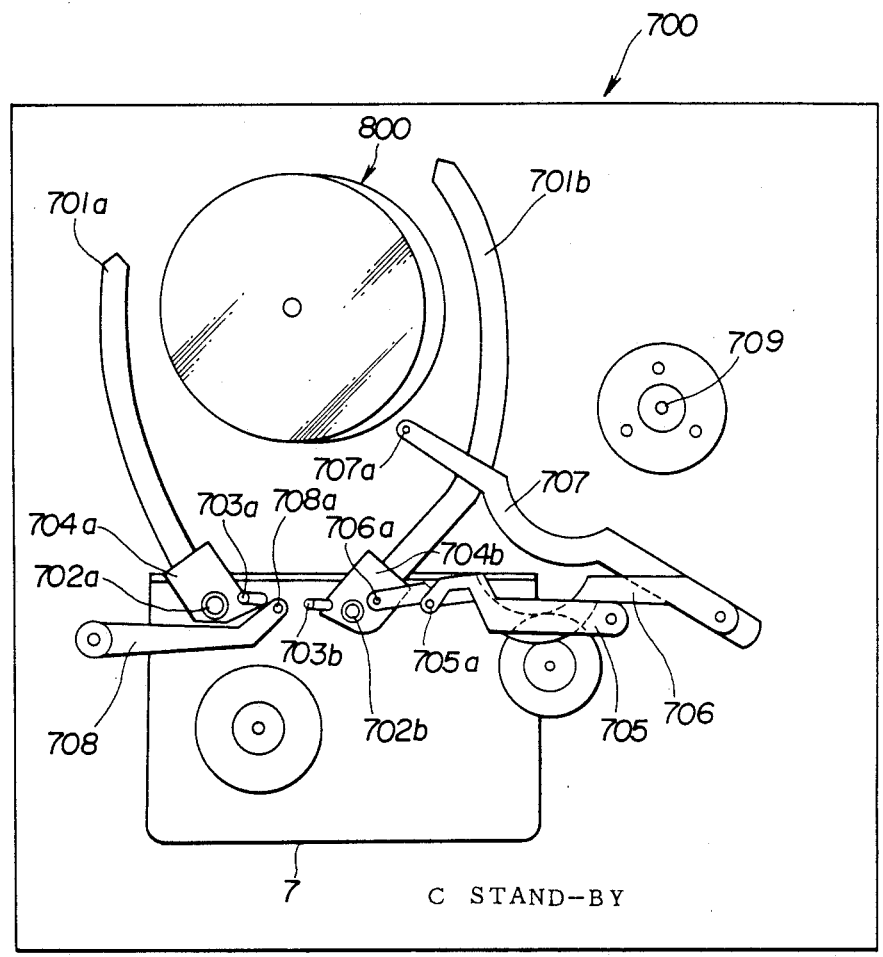
FIG. 22 is a plan view showing a tape loading mechanism for drawing out a magnetic tape from the tape cassette and for wrapping the magnetic tape around a guide drum in a first ready-for-loading state for the standard size tape cassette.
Figure 24:
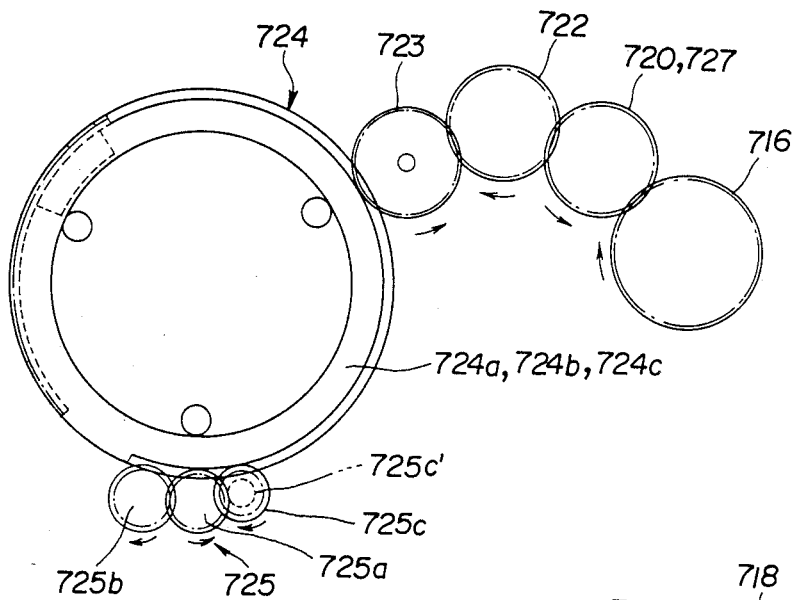
FIG. 24 is a plan view showing a gear train used in the drive mechanism in FIG. 22.
Figure 23:
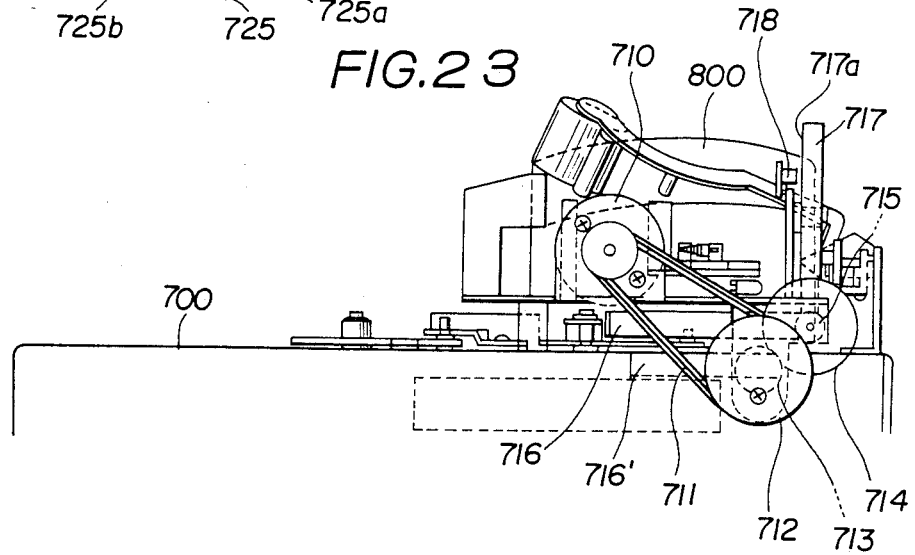
FIG. 23 is a side view showing a drive mechanism for moving the tape loading mechanism of FIG. 22.
Figure 25:
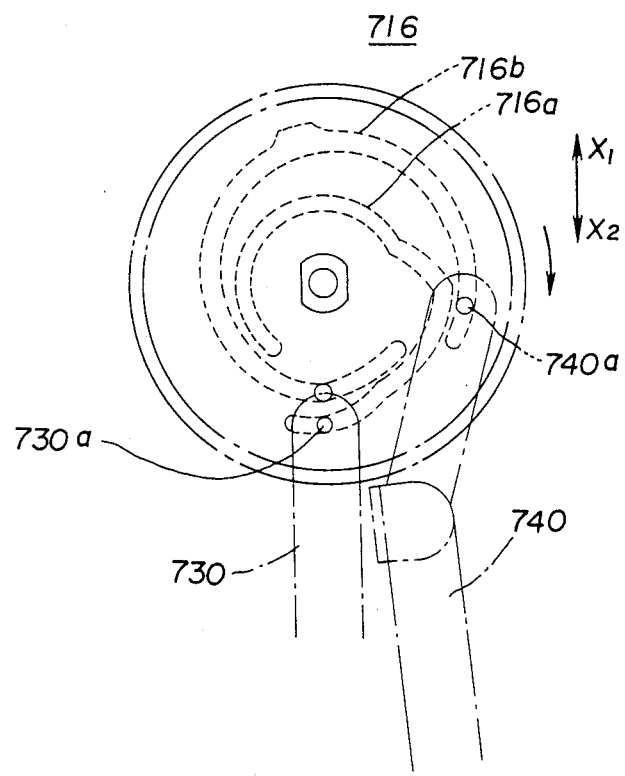
FIGS. 25(A) and (B) are respectively a plan view showing an overall view of the tape loading mechanism together with the cooperating drive mechanism shown in FIGS. 22–24 and a diagram showing the pattern of a cam groove formed on a cam gear shown in FIG. 27.

The arms carrying the various poles in FIG. 22 are moved responsive to the type of the tape cassette placed on the cassette tray 300 by a drive mechanism as will be described with reference to FIGS. 22-25. In the state shown in FIG. 22, the base members 704a and 704b, and the arms 705-708 are in a state adapted for the compact size tape cassette. In other words, the poles on the base member and the poles on the arms are positioned so as to be accepted into the cutouts 8 and 9 on the compact size tape cassette 7 placed on the cassette tray 300 through the cutout 303 of the cassette tray. This state will be referred to as a C STAND-BY. Referring to FIG. 23, the drive mechanism comprises the motor 710, a belt 711 driven by the motor 710 for rotating a pulley 712, gears 713 and 714 driven by the pulley 712 and a worm gear 715 carried by the gear 714. The worm gear 715 drives on the one hand a main cam gear 716 and on the other hand a sub-cam gear 717 shown in FIG. 23. The main cam gear 716 drives gears 716, 720, 721, 722 and 723 as shown in FIG. 24, and the gear 723 drives a ring-shaped gear system 724. The ring-shaped gear system 724 comprises a first ring-shaped gear 724a, a second ring-shaped gear 724b, and a third ring-shaped gear 724c integral with the second ring-shaped gear 724c, and the gears 724a, 724b and 724c are stacked together on a same rotation axis. It should be noted that the gear 724a and the gears 724b, 724c are rotated in mutually opposite directions by a gear system 725. More specifically, the gear system 725 comprises a first gear 725a, a second gear 725b meshing with the first gear 725a and a third gear 725c also meshing with the first gear 725a. The first gear 725a is rotated responsive to the rotation of the gear 724a, and the gear 724b which meshes with the second gear 725b is rotated in the opposite direction with the same speed as the gear 724a. It should be noted that the gear 724c which is integral with the gear 724b is also rotated unitarily with the gear 724b. When the gear 724b is rotated to a predetermined position to be described later, the meshing of the gear 725b with the ring gear 724b is released and the gear 725c starts to drive the gear 724c which is integral with the gear 724b with an increased speed of rotation. For this purpose, the gear 724b has a toothed portion extending for a limited angular range and the gear 724c has a toothed portion extending for another limited angular range. Further, the number of teeth on the gear 725b and on the gear 725c are different so that the gear 725c is rotated at a faster speed than the gear 725b.

FIG. 25(A) shows link mechanism connected to the ring gear system 724 for moving the base member 704a and 704b along the guide grooves 701a and 701b. The link mechanism comprises a link arm 726 connected at one end to the ring-shaped gear 724 by a pin 726a and the other end of the link arm 726 is connected to the base member 704a. Further, the link mechanism comprises a link arm 727 connected at one end to the ring-shaped gear 724 by a pin 727a and the other end of the link arm 727 is connected to the base member 704b. Thus, responsive to the rotation of the motor 710, the ring-shaped gear 724a and 724c are rotated in the opposite directions at a same speed, and thereafter the base member 704a and the base member 704b are moved along the grooves 701a and 701b at the same speed towards the guide drum 800. When the base member 704b reaches the half loading state corresponding to the aforementioned predetermined position of the ring-shaped gear 724c, the ring-shaped gear 724c starts to rotate with an increased speed and the base member 704 starts to move with a higher speed.

FIG. 25(A) further shows a mechanism for moving the arms 705-708. Referring to the drawing, an end of a lever 730 is connected to the cam gear 716 by a pin 730a. The pin 730a is engaged with a cam groove to be described later with reference to FIG. 25(B). Thus, the lever 730 is moved in a radial direction of the cam gear 716 responsive to the rotation of the cam gear. The other end of the lever 730 is connected to a fan-shaped lever 731 which is held rotatably on the main chassis 700 by a pin 731a, and the lever 731 is swung around the pin 731a responsive to the actuation by the lever 730. The lever 731 has a toothed part 731b at a fan-shaped end surface, and the toothed part 731b is engaged with a gear 732 held rotatably on the main chassis 700 Further, the gear 732 is meshed on the one hand with a gear 733 which is a gear formed at an end of the arm 705 and on the other hand with a gear 735a carrying a smaller gear 735b formed thereon as an integral part. The gear 735b in turn meshes with a gear 736 which drives a gear 737 formed at an end of the arm 706. Thus, responsive to the rotation of the cam gear 716, the lever 730 and the lever 731 are swung and the arms 705 and 706 are swung with respective speeds. Further, another lever 740 is engaged with a second cam groove on the cam gear 716 in a manner movable in the radial direction of the cam gear 716 as will be described, and the lever actuates a further lever 741 held rotatably on the main chassis 700 by a pin 741a responsive to the rotation of the cam gear 716. Responsive to the actuation by the lever 740, the lever 741 is swung clockwise or counterclockwise on the chassis 700. The lever 741 has a toothed surface 741b at one end and a gear 742 held rotatably on the main chassis 700 is engaged with the toothed surface 741b of the lever 741. The gear 742 on the other hand is engaged with a toothed part 743 formed at an end of the arm 707. Thus, responsive to the rotation of the cam gear 716, the levers 740 and 741 are actuated, and responsive thereto, the arm 707 is swung.

FIG. 25(B) shows the pattern of cam grooves 716a and 716b formed on the cam gear 716. The aforementioned pin 730a is engaged with the cam groove 716a and the aforementioned pin 740a is engaged with the cam groove 716b. The cam grooves 716a and 716b comprise a plurality of spiral groove portions and the levers 730 and 740 engaging with the grooves 716a and 716b are moved in the radial direction of the cam groove 716 as previously described with the speed which changes with the angle of rotation of the cam gear 716. Thus the arms 705-707 are moved with the speed which changes responsive to the rotation angle of the cam gear 716, and the drawing out of the magnetic tape from the tape cassette and wrapping of the magnetic tape around the guide drum is properly achieved.

Figure 26:
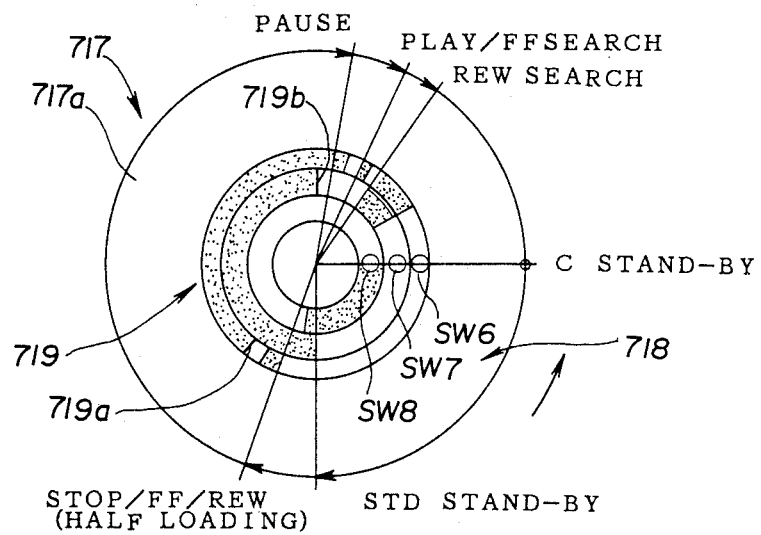
FIG. 26 is a diagram showing a detector for detecting the state of the tape loading mechanism of FIG. 25 (A)

Thus, the state of the tape loading mechanism such as the base members 704a and 704b, and the arms 705-707 is determined uniquely by the rotation of the cam gear 716. In other words, the state of the tape loading mechanism is determined by the rotational angle of the cam gear 716. As already described, the cam gear 716 is driven by the worm gear 715 which also drives the sub-cam gear 717. The sub-cam gear 717 has the same diameter and the same toothing as the main cam gear 716, and therefore, the rotational angle of the sub-cam gear 717 also determines the state of the loading mechanism. In the present embodiment, the sub-cam gear 717 carries on its surface 717a facing in the front direction a plurality of concentric reflection patterns 719a, 719b and 719c as illustrated in FIG. 26. In order to detect the reflection patterns, a detector 718 comprising a plurality of optical sensors SW6, SW7 and SW8 aligned horizontally as shown in FIG. 25(A) and in FIG. 26 are provided so as to face the patterns 719a, 719b and 719c, respectively.

Figure 27:
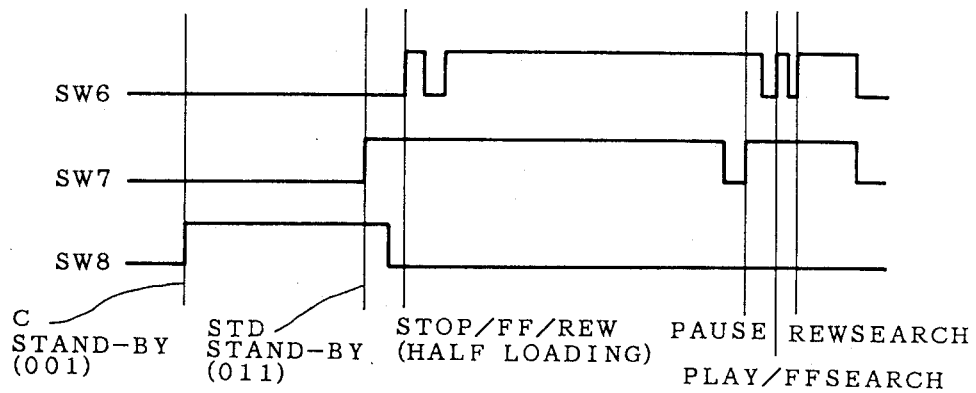
FIG. 27 is a diagram showing an output signal from the detector of FIG. 26.

Responsive to the rotation of the sub-cam gear 717, the reflection of light detected by the sensors SW6-SW8 is changed as illustrated in FIG. 27. Thus, in the C STAND-BY state shown in FIG. 22 where the tape loading mechanism is in the state ready for loading of the magnetic tape in the compact size tape cassette, the sensors SW6, SW7 and SW8 detect the reflection from the portion of the reflection pattern indicated by C STAND-BY in FIG. 26. In this state, the sensors SW6 and SW7 detecting reflection from the pattern 719a and pattern 719b produce a low level output while the sensor SW8 produces a high level output. Thus, in the state shown in FIG. 22, the state of the detector 718 may be represented by (001). Responsive to a further rotation of the sub-cam gear 717 in the counterclockwise direction from the C STAND-BY state in FIG. 22, the tape loading mechanism assumes a second state in which the portion of the reflection patterns indicated by STD STAND-BY coincides with the horizontally aligned sensors SW6, SW7 and SW8. In this state, the sensor SW6 which faces the reflection pattern 719a produces a low level output while the sensors SW7 and SW8 which face the reflection patterns 719b produce a high level output as shown in FIG. 27. Thus, in the STD STAND-BY state, the state of the detector 718 may be represented by (011).

Figure 28:
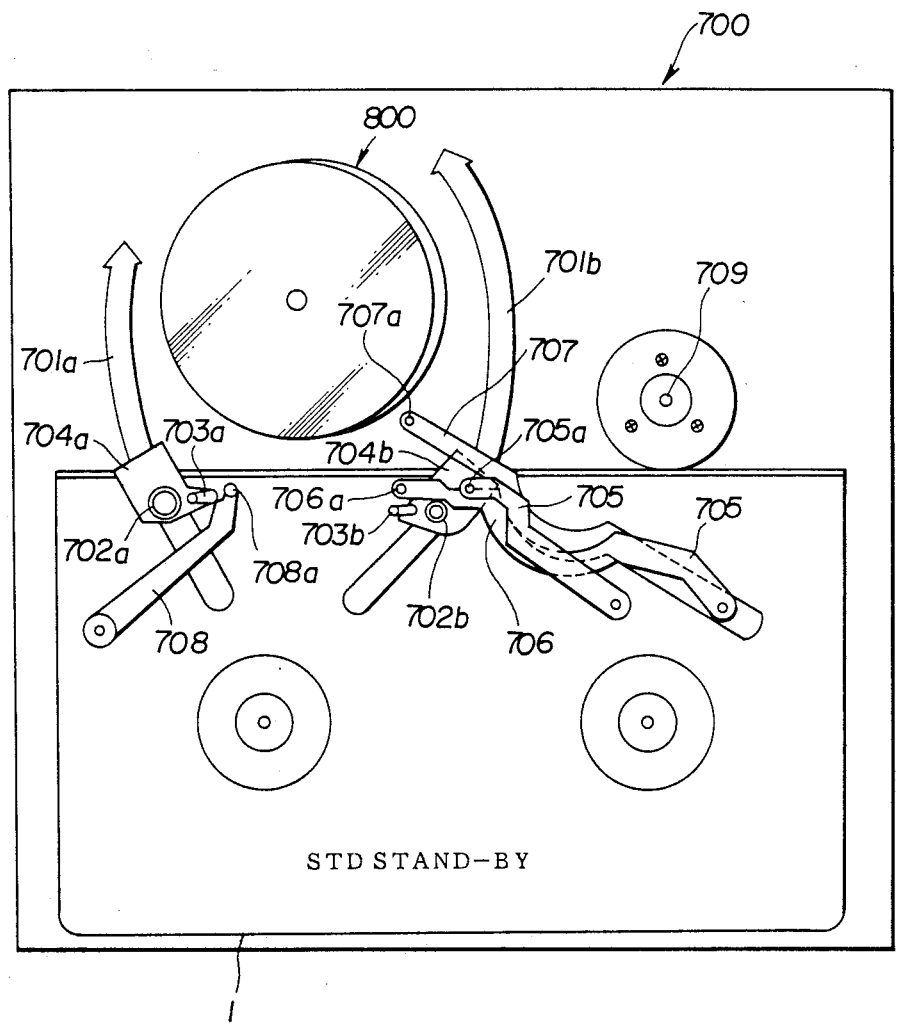
FIG. 28 is a plan view similar to FIG. 22 showing a second ready-for-loading state for the compact size tape cassette.

FIG. 28 shows the STD STAND-BY state of the tape loading mechanism. In this state, the tape loading mechanism, such as the base members 704a and 704b, and the arms 705-708, is moved to a state ready for drawing out the magnetic tape from the standard size tape cassette and for wrapping the magnetic tape around the guide drum 800. It should be noted that the poles 705a-708a at the end of the arms 705-707 are positioned so as to be accepted in the cutouts 2 and 3 of the standard size tape cassette 1 on the cassette tray 300 through the cutout 303 of the cassette tray. In this state, the sub-cam gear 717 is in a state further rotated in the counterclockwise direction, and the portion of the reflection patterns 719a, 719b and 719c indicated as STD STAND-BY is aligned with the horizontal row of the sensors SW6-SW8. Thus, the output of the sensor SW6 which does not face the reflection pattern 719a assumes a low level state while the outputs of the sensors SW7 and SW8 which face the reflection patterns 719a and 719b assume a high level state. In other words, the state of the detector 718 in the STD STAND-BY state shown in FIG. 28 may be represented by (011).

Figure 29:
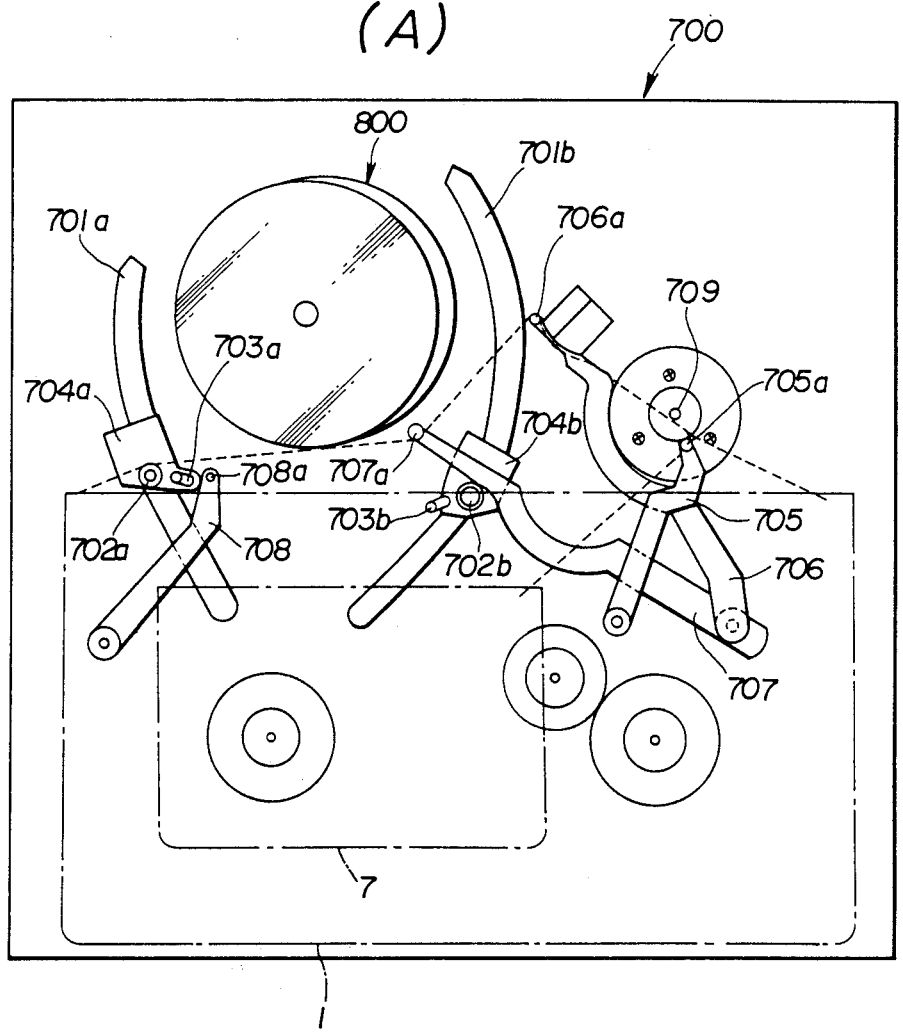
FIGS. 29(A) and (B) are plan views similar to FIGS. 22 and 28 showing a half loading state and a complete loading state.
Figure 29:
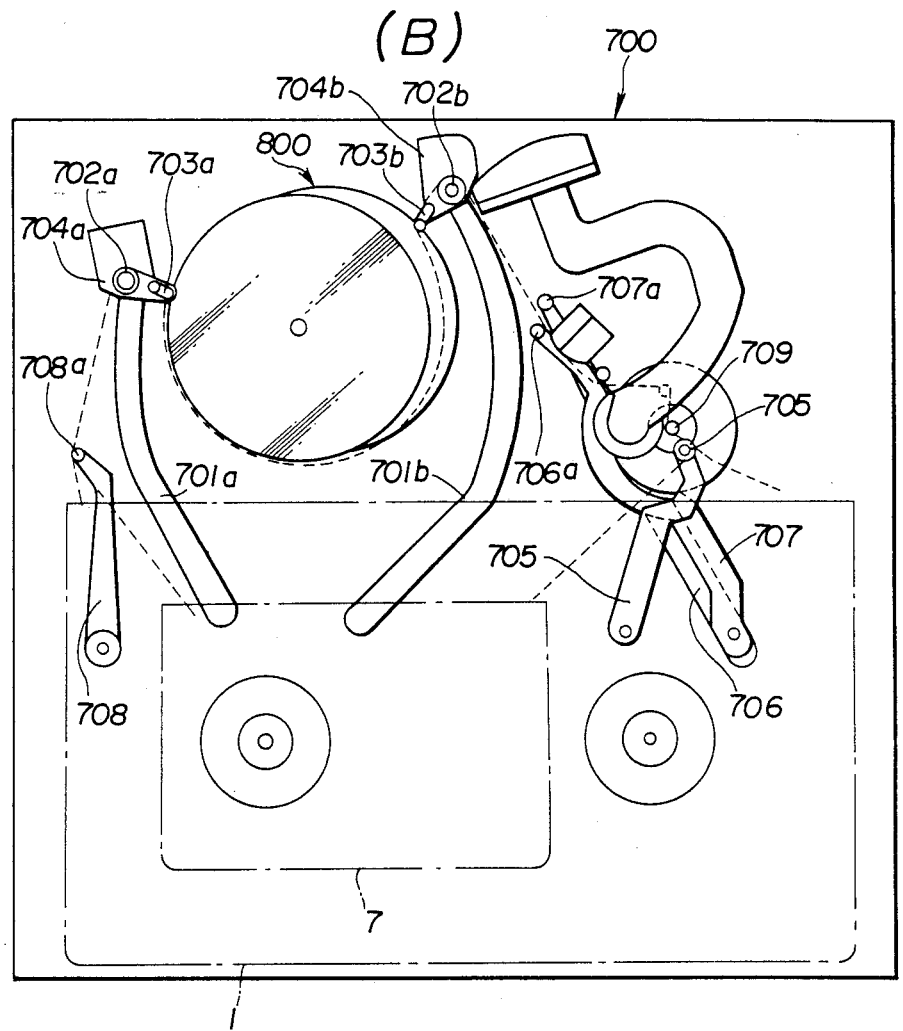

FIG. 29(A) shows the half loading state in which the magnetic tape makes tangential contact with the guide drum 800. This state is used for the STOP mode, the FAST FORWARD mode, and the REWIND mode. In this state, the motor 710 is further rotated and the tape loading mechanism is moved further in the direction of the drum 800. It can be seen that the poles 702a and 705a are used to draw out the magnetic tape from the compact size tape cassette 7 and the poles 702a and 706a are used to draw out the magnetic tape from the standard size tape cassette 1. In the drawing, the path of the magnetic tape is represented by a broken line. Further, the pole 707a prevents the magnetic tape from being wrapped around the drum 800. Responsive to this state, the sub-cam gear 717 is further rotated in the counterclockwise direction, and the sensors SW6-SW8 produce output signals as indicated by STOP/FF/REW in FIG. 27.

FIG. 29(B) shows the fully loaded state in which the magnetic tape is wrapped around the drum 800 by the oblique poles 703a and 703b held on the base members 704a and 704b and the path of the magnetic tape is defined further by the poles 708a, 702a, 702b, 705. FIG. 29(B) further shows a capstan 709 and a pinch roller engaged with the capstan 709. In this state, the poles 706a and 707a are not engaged with the magnetic tape. Responsive to this state, the cam gear 717 is further rotated in the counterclockwise direction and the sensors SW6-SW8 produce the output signals responsive to the portion of the reflection patterns 719a, 719b and 719c indicated by Play/FFSearch as shown in FIG. 27.

It should be noted that the tape loading mechanism assumes the C STAND-BY state shown in FIG. 22 when the compact size tape cassette is placed on the cassette tray 300 and is moved to the C state shown in FIG. 3(C). Further, in the C STAND-BY state, the reel drive mechanism is in the UP state shown in FIG. 7(B). On the other hand, the tape loading mechanism should assume the STD STAND-BY state shown in FIG. 28 when the standard size tape cassette is placed on the cassette tray 300 and is moved to the STD state shown in FIG. 3(D). Further, in this STD STAND-BY state, the reel drive mechanism is in the DOWN state shown in FIG. 7(C). Furthermore, when the type of the tape cassette placed on the cassette tray 300 is changed, the state of the tape cassette loading mechanism, the state of the reel drive mechanism, and the state of the tape loading mechanism are changed. As described at the beginning of this specification, it is desirable that the time required for the change in the state of each mechanism be sufficiently short so that the user of the video tape recorder does not notice any difference when the compact size tape cassette is loaded or the type of the tape cassette is changed. FIG. 30 shows a block diagram of a control system used for controlling the cassette loading mechanism, the reel drive mechanism and the tape loading mechanism. Referring to the drawing, the control system comprises a controller 900 which detects the state of the switches 307 and 308 for discriminating the type of the tape cassette placed on the cassette tray, the state of the optical sensors SW1–SW3 for detecting the state of the cassette loading mechanism, the state of the switches SW4 and SW5 for detecting the state of the reel drive mechanism, and the state of the switches SW6–SW8 for detecting the state of the tape loading mechanism, and controls the motors 401, 610 and 710 through respective drive circuits 901–903. The controller 900 is a microcomputer and controls the motors 401, 610 and 710 according to a program stored in a memory 900a responsive to an EJECT key or LOAD key generally shown in FIG. 30 by the reference numeral 900b. Thus, the states of the cassette loading mechanism, the reel drive mechanism and the tape loading mechanism of the tape cassette loading system of the present invention are controlled in a coordinated manner by the controller 900.

Further, various variations and modifications may be made within the scope of the present invention.

What is claimed is:

1. A tape cassette driving system of a magnetic recording and reproducing apparatus recording and/or reproducing an information signal on and from a magnetic tape, for selectively driving a first magnetic tape contained in a first tape cassette having a first size and a second magnetic tape contained in a second tape cassette having a second size substantially smaller than said first tape cassette, said second tape cassette including a take up reel having a toothed part thereon, comprising:

a main chassis carrying a first plurality of positioning pins for holding said first tape cassette at a first predetermined position and a rotatable reel disk for engagement with a take up reel of said first tape cassette so as to drive said take up reel and further carrying a toothed part thereon;

a sub-chassis carrying a second plurality of positioning pins for holding said second tape cassette at a second predetermined position and a drive gear arrangement which engages said toothed part of the reel disk and said toothed part of the take up reel of said second tape cassette; and a sub-chassis driving mechanism for moving said sub-chassis up and down with respect to said main chassis, said sub-chassis driving mechanism lowering said sub-chassis to such a level that said drive gear arrangement and said second plurality of positioning pins carried by the sub-chassis do not obstruct the first tape cassette from being held at said first predetermined position when the first tape cassette is held by the first plurality of positioning pins on the main chassis, and said sub-chassis driving mechanism raising said sub-chassis such that said drive gear arrangement engages said toothed part of the reel disk on the main chassis and further engages said toothed part of the take up reel of the second tape cassette when the second tape cassette is held by the second plurality of positioning pins on the sub-chassis.

2. A tape cassette driving system as claimed in claim 1 in which said sub-chassis driving mechanism comprises a plurality of swing levers connected rotatably to each other and to said main chassis and carrying said sub-chassis, a drive shaft held rotatably at a predetermined level relative to said main chassis and which is connected to at least one of said plurality of swing levers for swinging said plurality of swing levers to which the drive shaft is connected up and down, and a driving means connected to said drive shaft, said swing levers moving said sub-chassis along an arcuate path such that the drive gear carried by the sub-chassis engages the toothed part of said reel disk from a direction slightly offset sideways from said reel disk when the sub-chassis is moved upwards.

3. A tape cassette driving system as claimed in claim 2 in which said driving means comprises a motor and a main cam gear driven by said motor.

4. A tape cassette driving system as claimed in claim 2 in which one of said swing levers is connected with a lever member carrying a detector for detecting a tab on the second tape cassette indicating by its existence or absence whether or not new recording on the second tape cassette is allowed, said lever member being moved to a position for detection of the existence or absence of said tab on said second tape cassette responsive to the ascent of said sub-chassis caused by the swinging motion of said swing levers.

5. A tape cassette driving system as claimed in claim 1 in which said drive gear arrangement and said second plurality of positioning pins carried by said sub-chassis are positioned at a level such that the drive gear arrangement and the second plurality of positioning pins are located above the level of said main chassis and also below the first tape cassette held at the first predetermined level by said first plurality of positioning pins when the sub-chassis is lowered by the sub-chassis driving mechanism.

6. A tape cassette driving system as claimed in claim 1 in which said sub-chassis carries a plurality of positioning parts for restricting an upward movement of the sub-chassis relative to the main chassis caused by the sub-chassis driving mechanism, said positioning parts engaging said main chassis when said sub-chassis is raised by the sub-chassis driving mechanism.

7. A tape cassette driving system as claimed in claim 6 in which said plurality of positioning parts are provided on an upper surface of said sub-chassis and on an outer side wall of the sub-chassis.

8. A tape cassette driving system as claimed in claim 2 in which said sub-chassis driving mechanism further comprises a connection rod connecting a pair of said swing levers for moving the swing levers simultaneously such that the sub-chassis is maintained horizontal during the up and down movement of said sub-chassis.

9. A tape cassette driving system as claimed in claim 8 in which each of said swing levers carrying said sub-chassis has a hole at an end thereof which is opposite to a part of the swing lever connected to the connection rod with respect to another part of the swing lever connected rotatably to the main chassis, for engagement with pins formed on a side wall of the sub-chassis, said sub-chassis driving mechanism being constructed such that said pins are located at a level higher than the level of the drive shaft.

10. A tape cassette driving system as claimed in claim 9 in which each said hole at the end of the respective swing lever is an elongated hole and each said swing lever is urged by a spring such that the sub-chassis is biased upwards.

11. A tape cassette driving system as claimed in claim 1 further comprising a brake mechanism accommodated in said reel disk for braking the rotation of the reel disk, a brake control mechanism mechanically connected to said brake mechanism for controlling the engagement and disengagement of the brake mechanism to and from the reel disk, and cam means connected to said brake control mechanism and driven by said sub-chassis driving mechanism for moving the brake control mechanism such that the reel disk is prohibited from rotation during the movement of the sub-chassis in the upward direction except for an interval immediately before the engagement of the drive gear on the sub-chassis with the reel disk.

12. A tape cassette driving system as claimed in claim 11 in which said sub-chassis driving mechanism comprises a cam gear and a motor for driving the cam gear, said cam means comprising a cam groove provided on a surface of the cam gear and a pin engaged with the cam groove, said pin being provided on a member of the brake control mechanism for moving the brake control mechanism responsive to the rotation of the cam gear, and said cam groove comprising a a first part having a first radius of curvature and a second part having a second radius of curvature smaller than the first radius of curvature.

13. A tape cassette driving system as claimed in claim 12 in which said reel disk has a space formed inside the reel disk, said brake mechanism comprising a brake arm disposed in the space formed inside the reel disk in a manner movable between a first position and a second position, a brake shoe carried at an end of the brake arm such that the brake shoe is engaged with an inner wall of the reel disk when the arm is in the first position and is disengaged from the inner wall when the reel disk is in the second position, and a spring urging the brake arm to the first position, and said brake control mechanism comprising levers connected to the brake arm for moving the brake arm between said first position and second position.

14. A tape cassette driving system as claimed in claim 12 in which said first part of the cam groove and said second part of the cam groove form a closed cam groove, said sub-chassis driving mechanism for driving said cam gear further comprising a gear system for moving said sub-chassis up and down, said gear system being constructed such that the cam gear is rotated by a predetermined integer number of times when the sub-chassis is moved from a fully lowered state to a fully raised state.

* * * * *